United States Patent
Shin et al.

(10) Patent No.: US 9,853,583 B2
(45) Date of Patent: Dec. 26, 2017

(54) MOTOR DRIVING APPARATUS AND CONTROLLING METHOD THEREOF

(71) Applicants: Samsung Electronics Co., Ltd., Suwon-si (KR); Seoul National University R&DB Foundation, Seoul (KR)

(72) Inventors: Jong-Hyun Shin, Seoul (KR); Jin Woong Kim, Seoul (KR); Han Sol Seo, Seoul (KR); Jung-Ik Ha, Seoul (KR)

(73) Assignees: SAMSUNG ELECTRONICS CO., LTD. (KR); SEOUL NATIONAL UNIVERSITY R&DB FOUNDATION (KR)

( * ) Notice: Subject to any disclaimer, the term of this patent is extended or adjusted under 35 U.S.C. 154(b) by 0 days.

(21) Appl. No.: 14/983,826

(22) Filed: Dec. 30, 2015

(65) Prior Publication Data

US 2016/0190964 A1    Jun. 30, 2016

(30) Foreign Application Priority Data

Dec. 30, 2014  (KR) .......................... 10-2014-0193060

(51) Int. Cl.
  *H02P 21/00*  (2016.01)
  *H02P 21/14*  (2016.01)
  *H02P 21/16*  (2016.01)

(52) U.S. Cl.
  CPC ............ *H02P 21/145* (2013.01); *H02P 21/14* (2013.01); *H02P 21/16* (2016.02)

(58) Field of Classification Search
  CPC ...... H02P 3/00; H02P 5/00; H02P 6/00; H02P 23/00; H02P 25/00; H02P 27/00; H02P 3/18; H02P 27/04; H02P 21/00
  (Continued)

(56) References Cited

U.S. PATENT DOCUMENTS 7,064,504 B2 *  6/2006  Imai ........................ B60L 11/14
                                                318/400.02
8,907,602 B2 * 12/2014  Mukai ..................... H02P 6/001
                                                318/400.02

(Continued)

FOREIGN PATENT DOCUMENTS

JP    2013106445 A    5/2013
KR    20120106449 A    9/2012
KR    20130039613 A    4/2013

*Primary Examiner* — Antony M Paul
(74) *Attorney, Agent, or Firm* — McAndrews, Held & Malloy, Ltd.

(57) ABSTRACT

Disclosed herein are a motor driving apparatus and a controlling method thereof. The motor driving apparatus includes a motor having a rotor including a permanent magnet, and a stator, an inverter to supply a driving power to the motor, and a control unit to estimate a parameter using a startup estimation when a rotation speed of the rotor is less than a preset startup speed, to estimate the parameter using a driving estimation with compensating for a dead time when the rotation speed of the rotor is equal to or greater than the preset startup speed and a torque of the rotor is equal to or less than a preset driving torque, and to estimate the parameter using the driving estimation without the dead time compensation when the rotation speed of the rotor is equal to or greater than the preset startup speed and the torque of the rotor exceeds the preset driving torque.

25 Claims, 25 Drawing Sheets

(58) Field of Classification Search
USPC ......... 318/400.01, 400.14, 400.15, 700, 701,
318/727, 799, 800, 801, 430, 432, 400.02;
363/40, 44, 95, 120, 174, 175; 388/800
See application file for complete search history.

(56) References Cited

U.S. PATENT DOCUMENTS

| | | | | |
|---|---|---|---|---|
| 9,007,004 | B2* | 4/2015 | Hunter | ................ H02P 21/0003 |
| | | | | 318/400.02 |
| 9,013,137 | B2* | 4/2015 | Aoki | ......................... H02P 6/18 |
| | | | | 318/727 |
| 9,112,436 | B2* | 8/2015 | Fujii | ....................... H02P 6/002 |
| 2009/0309530 | A1 | 12/2009 | Shin | |
| 2011/0031909 | A1 | 2/2011 | Ohgushi | |

* cited by examiner

MOTOR DRIVING APPARATUS AND CONTROLLING METHOD THEREOF

RELATED APPLICATION(S)

This application claims the benefit of Korean Patent Application No. 10-2014-0193060, filed on Dec. 30, 2014 in the Korean Intellectual Property Office, the disclosure of which is incorporated herein by reference.

BACKGROUND

The disclosure relates to a motor driving apparatus which estimates a parameter for controlling and a controlling method of the motor driving apparatus.

A motor is an apparatus which obtains a rotary force from electrical energy, and may include a stator and a rotor. The rotor may be configured to electromagnetically interact with the stator and may rotate by a force acting between a magnetic field and a current flowing in a coil.

The motor operates by receiving a driving power generated by an inverter. Also, to generate the driving power, a current command should be generated in a speed controller, a voltage command should be generated in a current controller, and the inverter should receive the generated commands. Also, the speed controller and the current controller are formed of a proportional integral derivative (PID) controller, and a gain of the PID controller is determined by a parameter. Thus, determining the parameter should precede supplying the driving power of the motor. However, a fixed constant parameter may already exist among the parameters; a variable parameter may exist depending on each circumstance. For example, a phase resistance, a counter electromotive force constant, a d-axis inductance, and a q-axis inductance may be the variable parameter.

SUMMARY

The disclosure provides a motor driving apparatus which estimates a parameter by reflecting nonlinearity of an inductor, and a controlling method thereof.

According to an embodiment, a motor driving apparatus includes a motor having a rotor including a permanent magnet, and a stator, an inverter to supply a driving power to the motor, and a control unit to estimate a parameter by supplying a d-axis test current and a q-axis test current for a predetermined amount of time and to compensate for a dead time based on a polarity of a driving current by supplying a step-like composite square wave as a driving current.

In addition, according to an embodiment, the control unit may control the inverter such that the driving current becomes the step-like composite square wave due to a command current in a saw tooth waveform, and may generate the command current in the saw tooth waveform based on a position of the rotor.

In addition, according to an embodiment, the control unit may control the inverter such that times at which the d-axis test current and the q-axis test current are supplied do not overlap.

In addition, according to an embodiment, the parameter estimated in the control unit may be a phase resistance, a counter electromotive force constant, a d-axis inductance, and a q-axis inductance.

In addition, according to an embodiment, the control unit may not control the inverter such that the driving current becomes the step-like composite square wave when a torque of the rotor is equal to or greater than a preset driving torque.

In addition, according to an embodiment, the control unit may estimate the parameters using a startup estimation when the rotor is at standstill.

According to another embodiment, a motor driving apparatus includes a motor having a rotor including a permanent magnet, and a stator, an inverter to supply a driving power to the motor, and a control unit to estimate a parameter using a startup estimation when a rotation speed of the rotor is less than a preset startup speed, to estimate a parameter using a startup estimation when a rotation speed of the rotor is less than a preset startup speed, to estimate the parameter using a driving estimation with a dead time compensation when the rotation speed of the rotor is equal to or greater than the preset startup speed and a torque of the rotor is equal to or less than a preset driving torque, and to estimate the parameter using the driving estimation without the dead time compensation when the rotation speed of the rotor is equal to or greater than the preset startup speed and the torque of the rotor exceeds the preset driving torque.

In addition, according to another embodiment, the control unit may control the inverter to supply a d-axis high-frequency test voltage and a q-axis high-frequency test voltage in order to estimate a d-axis inductance, a q-axis inductance, and a phase resistance in the startup estimation of the control unit, and the control unit may control the inverter to supply a first d-axis direct current test current and a second d-axis direct current test current in order to estimate the phase resistance in the startup estimation of the control unit.

In addition, according to another embodiment, the control unit may control the inverter to supply only a q-axis current in order to control the rotation speed of the rotor to be less than the preset startup speed, and calculates a d-axis magnetic flux and a q-axis magnetic flux of a rest frame in order to estimate a counter electromotive force constant in the startup estimation of the control unit.

In addition, according to another embodiment, the control unit may control the inverter to supply a d-axis test current and a q-axis test current for a predetermined amount of time in order to estimate a phase resistance, a counter electromotive force constant, a d-axis inductance, and a q-axis inductance in the driving estimation of the control unit.

In addition, according to another embodiment, the control unit may control the inverter such that a driving current becomes a step-like composite square wave, and compensates for a dead time based on a polarity of the driving current in the dead time compensation of the control unit.

According to an embodiment, a controlling method of the motor driving apparatus includes supplying a d-axis test current and a q-axis test current for a predetermined amount of time, estimating a parameter based on a d-axis current and a q-axis current of a time when the d-axis test current and the q-axis test current are supplied and a time when the d-axis test current and the q-axis test current are not supplied, supplying a step-like composite square wave as a driving current, and compensating for a dead time based on a polarity of the driving current.

According to another embodiment, a controlling method of the motor driving apparatus includes estimating a parameter using a startup estimation when a rotation speed of a rotor is less than a preset startup speed, estimating the parameter using a driving estimation with compensating for a dead time when the rotation speed of the rotor is equal to or greater than the preset startup speed and a torque of the rotor is equal to or less than a preset driving torque, and estimating the parameter using the driving estimation without the compensating for a dead time when the rotation speed of the rotor is equal to or greater than the preset startup speed and the torque of the rotor exceeds the preset driving torque.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
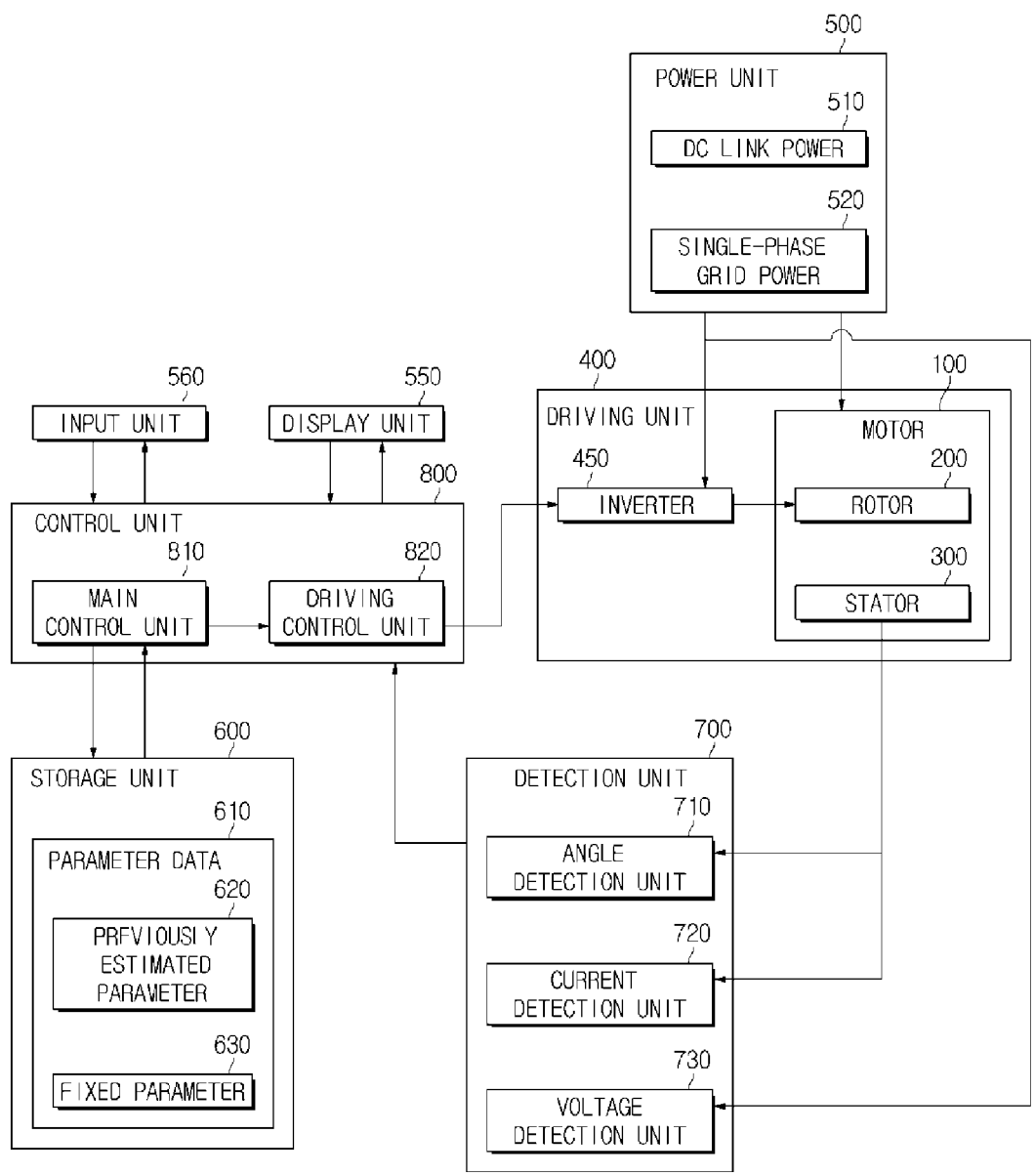
FIG. 1 is a block diagram of a motor driving apparatus according to an embodiment.

Embodiments described in the present specification and configurations illustrated in the drawings are merely preferred embodiments of the disclosure, and various modified embodiments that are capable of substituting the embodiments and the drawings of the present specification may exist at the time of applying the present application.

An embodiment of a motor driving apparatus 1 and a controlling method of the motor driving apparatus 1 will be described with reference to the accompanying drawings.

Hereinafter, an embodiment of a motor driving apparatus will be described with reference to FIG. 1.

FIG. 1 illustrates a configuration of the motor driving apparatus.

The motor driving apparatus 1 may include a driving unit 405, a power unit 500, a detection unit 700, a control unit 800, a storage unit 600, an input unit 560, and a display unit 550.

The driving unit 405 is a device for receiving a control signal of the control unit 800 to generate a driving force of a motor 100. Also, the driving unit 405 may include an inverter 450 and the motor 100.

The inverter 450 is a device for supplying a converted power to the motor 100 based on the control signal of the control unit 800. Also, the motor 100 is a device for generating a rotary force by converting the power provided from the inverter 450 and the power unit 500 to mechanical energy, and may include a rotor 200 and a stator 300.

The inverter 450 will be described in detail in FIGS. 7 to 9, and the motor 100 will be described in detail in FIGS. 2 to 6.

The power unit 500 may include a grid power 520 and a DC link power 510.

The grid power 520 is a power device for providing an AC power to the DC link power 510, etc. The grid power 520 may receive a power from the outside and transmit the power to the DC link power 510, or convert chemical energy to electrical energy as a battery and transmit the electrical energy to the DC link power 510.

The DC link power 510 converts the AC power received from the grid power 520 to the DC power in order to provide electrical energy for driving the inverter 450.

The detection unit 700 may include an angle detection unit 710 to detect a rotational displacement, a current detection unit 720 to detect a driving current supplied to a coil, and a voltage detection unit 730 to detect a DC voltage transmitted to the inverter 450.

The angle detection unit 710 may be disposed at one side of the stator 300 to detect the rotational displacement of the rotor 200.

Specifically, an N-type semiconductor is used in the angle detection unit 710, and a magnetic field may be expressed as a voltage using the Hall effect. Consequently, the angle detection unit 710 detects a change in the magnetic field by the rotation of the rotor 200, thereby outputting an angle, a frequency, a driving time, etc. related to the rotational displacement of the rotor.

Not only the Hall sensor, but also angle sensors such as a resolver, a potentiometer, an absolute encoder, an incremental encoder, and the like may be used as a means for detecting the rotational displacement of the rotor 200.

Specifically, the resolver is a type of a rotation transformer and is an analog type angle sensor which is connected to a shaft of the motor 100 to output AC voltage proportional to a position of the rotor 200. The potentiometer is an angle sensor which varies a variable resistance value in accordance with an angle to calculate an electrical input directly proportional to a rotation angle. Also, the absolute encoder is an angle sensor which detects a degree of rotation at a corresponding position using an optical pulse wave without setting a reference position, and the incremental encoder is an angle sensor which calculates an angle through an increase and a decrease in an angle measured by setting a reference position and detects a degree of rotation at a corresponding position using an optical pulse wave.

Other than the above, various types of sensors which measure an angle and a frequency may be used as an example of the angle detection unit 710.

In addition, one angle detection unit 710 may be provided, but either two, or three or more thereof may also be provided. The number of the angle detection unit 710 being provided may be determined in consideration of unit cost of the motor driving apparatus 1 being manufactured, an error range of a rotational displacement to be detected, etc.

In addition, the angle detection unit 710 may calculate a rotation speed of the motor 100 based on the rotation angle, the frequency, and the driving time of the rotor 200 detected by the angle detection unit 710, and may provide the rotation speed to a driving control unit 820.

The current detection unit 720 may detect a driving current value flowing in three input terminals of the motor 100. The current detection unit 720 may detect a voltage drop of a shunt resistor connected in series to the input terminal of the motor 100 or detect an output of a voltage distributor connected in parallel to the motor 100 between the input terminal of the motor 100 and a ground (GND) in order to detect the driving current value. Also, the current detection unit 720 may include a low pass filter (LPF) to remove a noise component included in a current signal of an output terminal of the inverter 450, and an analog-to-digital converter (A/D) to convert an analog current signal from which the noise component is removed to a digital signal.

The voltage detection unit 730 may detect DC voltage, which is a power signal of an input terminal of the inverter 450. Specifically, the voltage detection unit 730 may include a low pass filter (LPF) to remove a noise component included in a current signal of a power terminal of the inverter 450, and an analog-to-digital converter (A/D) to convert an analog voltage signal from which the noise component is removed to a digital signal.

The control unit 800 may include a main control unit 810 to generally control an operation of the motor driving apparatus 1, and the driving control unit 820 to control an operation of the driving unit 405.

In addition, the control unit 800 functions as a central processing unit. The type of the central processing unit may be a microprocessor, and the microprocessor is a processing unit in which an arithmetic logic unit, a register, a program counter, a command decoder, or a control circuit is provided in at least one silicon chip.

In addition, the microprocessor may include a graphic processing unit (GPU) to process graphic of an image or a video. The microprocessor may be implemented in a system-on-chip (SoC) form including a core and the GPU. The microprocessor may include a single core, a dual core, a triple core, a quadruple core and multiples thereof.

In addition, the control unit 800 may include a graphic processing board including the GPU, random-access memory (RAM), or read-only memory (ROM) at a separate circuit board electrically connected to the microprocessor.

The control unit 800 will be described in detail in FIGS. 7 to 9 below.

The storage unit 600 is a device to store data of the rotational displacement of the motor 100 detected by the detection unit 700 and the voltage command transmitted to the inverter 450, control data of the control unit 800, input data of the input unit 560, communication data of a communication unit, etc.

The storage unit 600 may store parameter data 610.

The parameter data 610 is used to calculate a current command and a voltage command in a speed controller 823 and a current controller 824.

A fixed constant parameter may exist among parameters, and a variable parameter changing depending on each circumstance may exist. Consequently, the parameter data 610 may include a previously estimated parameter 620 and a fixed parameter 630.

The previously estimated parameter 620 is a set of parameters of the motor 100 estimated before the current time. The previously estimated parameter 620 may be a parameter that was estimated just before to estimate a current parameter, or data estimated before that. Also, the previously estimated parameter 620 may be a previously estimated phase resistance, counter electromotive force constant, d-axis inductance, and q-axis inductance.

The fixed parameter 630 is a set of unchanging constants or parameters with small changes. Specifically, the fixed parameter 630 is a parameter used to calculate a gain of the PID controller, and having only small or no changes. Also, since the fixed parameter 630 is a fixed value, the fixed parameter 630 may be stored in the storage unit 600 at a time of manufacturing the motor driving apparatus 1.

In addition, the fixed parameter 630 may include motor inertia, a number of poles of the motor, and a startup parameter. That is, the motor inertia and the number of poles of the motor are constants that do not change due to the operation of the motor 100, and the startup parameter is a parameter with small changes when the motor 100 is assumed to always start using the same method.

The storage unit 600 may include a nonvolatile storage such as a ROM, a high speed RAM storage, a magnetic disc storage device, and a flash device, or other nonvolatile semiconductor storage devices.

For example, a secure digital (SD) memory card, a secure digital high capacity (SDHC) memory card, a mini SD memory card, a mini SDHC memory card, a trans flash (TF) memory card, a micro SD memory card, a micro SDHC memory card, a memory stick, a compact flash (CF), a multi-media card (MMC), an MMC micro, an extreme digital (XD) card, and the like may be used as a semiconductor memory device in the storage unit 600.

In addition, the storage unit 600 may include a network attached type storage device which is accessed through a network.

The input unit 560 is a combination of a plurality of manipulation buttons to select the operation of the motor driving apparatus 1. In the input unit 560, the manipulation buttons may be in a form of push buttons to be pressed, slide switches for a user to manipulate a desired operation of the motor driving apparatus 1, or may be a touch type for the user to input a desired operation. Other than the above, various types of input devices may be used as an example of the input unit 560 for the user to input a desired operation of the motor driving apparatus 1.

The display unit 550 may display a control state of the motor driving apparatus 1 controlled in the control unit 800, an operation state of the motor driving apparatus 1 detected by the detection unit 700, and the like to the user visually, aurally, and tactually.

Hereinafter, an embodiment of a motor including a rotor will be described with reference to FIGS. 2 to 5.

Figure 2:
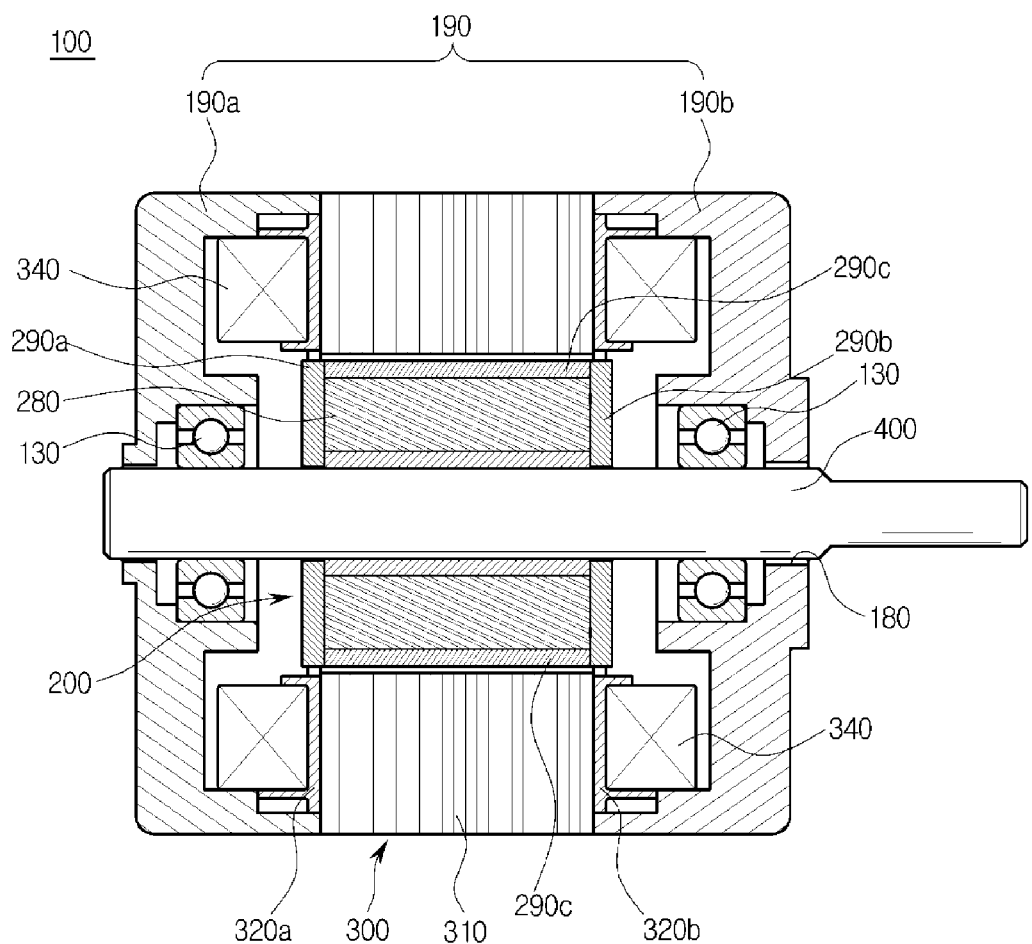
FIG. 2 is an axial cross-sectional view of a motor according to an embodiment.
Figure 3:
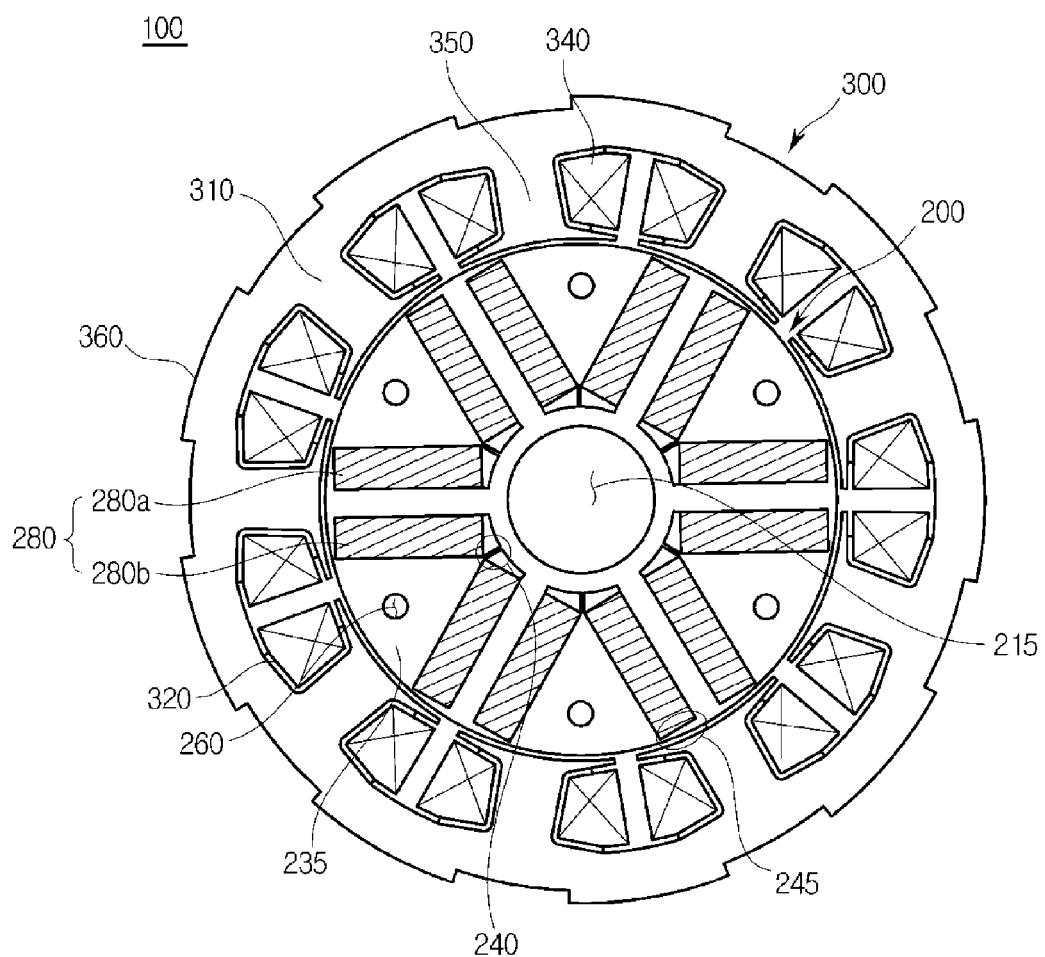
FIG. 3 is a transverse cross-sectional view of the motor according to an embodiment.
Figure 4:
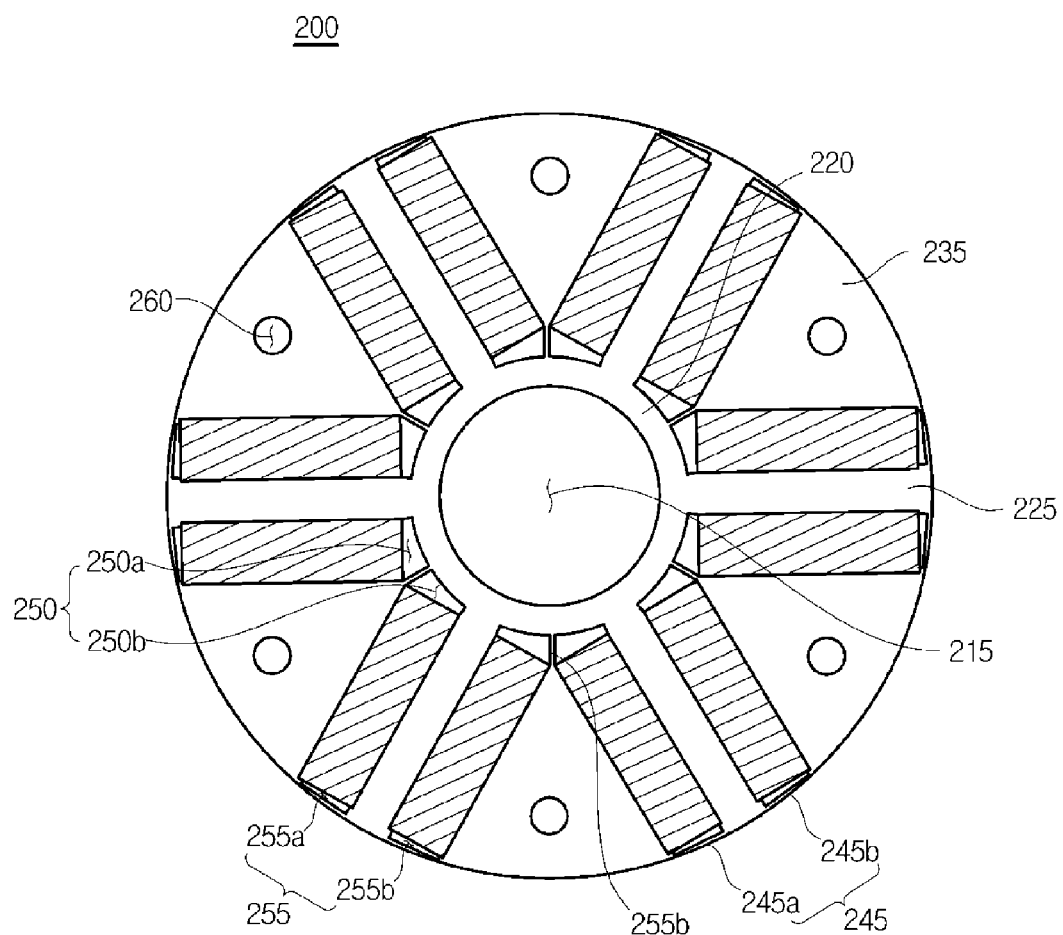
FIG. 4 is a transverse cross-sectional view of a rotor according to an embodiment.
Figure 5:
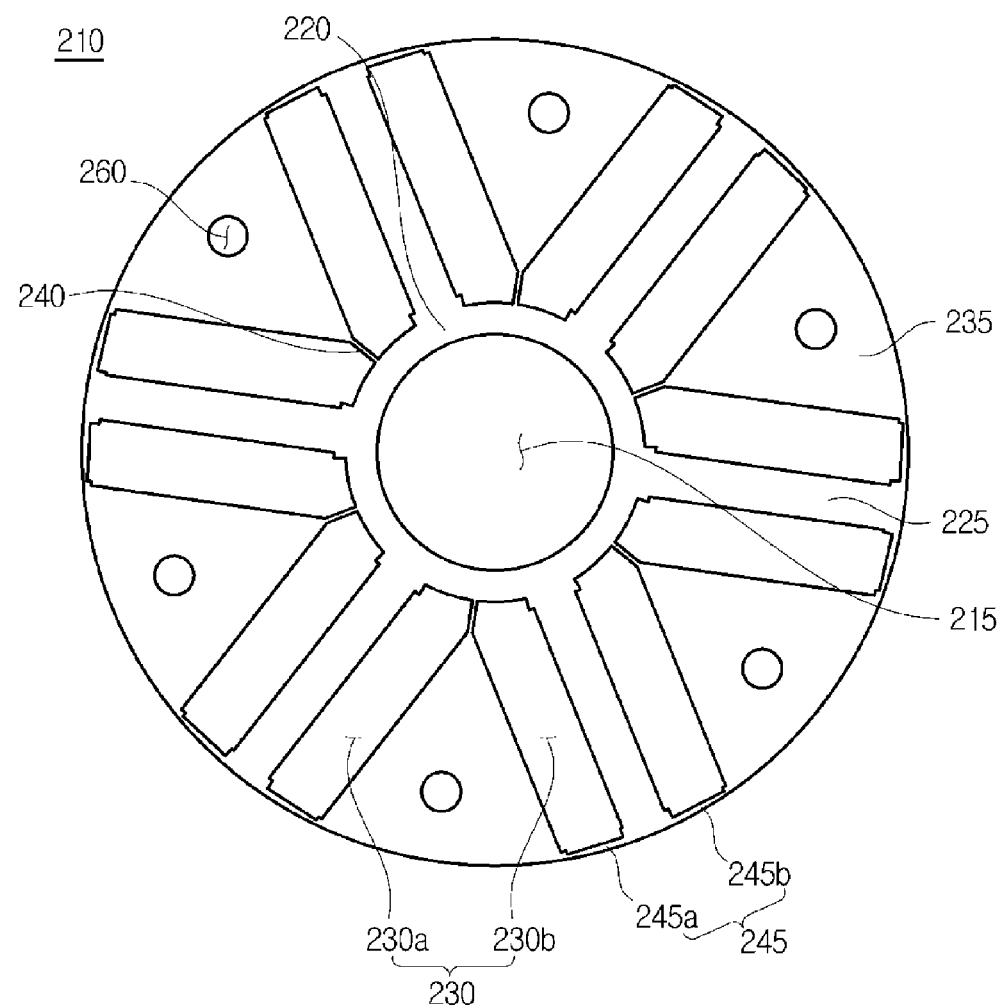
FIG. 5 is a transverse cross-sectional view of a rotor core according to an embodiment.

FIG. 2 illustrates an axial cross-section of a motor, and FIG. 3 illustrates a transverse cross-section of the motor. Also, FIG. 4 illustrates a transverse cross-section of a rotor, and FIG. 5 illustrates a transverse cross-section a rotor core.

The motor 100 may include a motor housing 190, the stator 300, a shaft 400, and the rotor 200.

The motor housing 190 forms an exterior of the motor 100, and is coupled to fixing protrusions 360 of the stator 300 to provide a fixing force such that the stator 300 does not rotate.

In addition, the motor housing 190 may be divided as a first motor housing 190a and a second motor housing 190b with respect to a transverse axis. Also, the first motor housing 190a and the second motor housing 190b may be connected to the stator 300.

The stator 300 may include a stator core 310, a plurality of teeth 350, coils 340, insulators 320, and the fixing protrusions 360.

The stator core 310 may maintain a shape of the stator 300 by forming a frame of the stator 300, and provide a passage in which a magnetic field is formed such that, when one of the plurality of teeth 350 is magnetized by power, magnetization of another of the plurality of teeth 350 abutting the one of the plurality of teeth 350 in a polarity different from the polarity of the one of the plurality of teeth 350 magnetized by the power is induced.

In addition, the stator core 310 may have a cylindrical shape, and may be formed by stacking press-processed steel plates. Also, the plurality of teeth 350 may be positioned at an inside of the stator core 310 along the circumferential direction, and the plurality of fixing protrusions 360 may be positioned at an outside of the stator core 310. Other than the above, various shapes may be used as an example of the shape of the stator core 310 to maintain the shape of the stator 300 and have the teeth 350 and the fixing protrusions 360.

In addition, a plurality of first insertion holes which penetrate the stator core 310 in the axial direction may be formed at the stator core 310. Also, fastening members such as pins, rivets, or bolts to couple each of the plates forming the stator core 310 may be inserted into the first insertion holes.

First insertion protrusions may be formed at the first motor housing 190a and the second motor housing 190b to be coupled to the first insertion holes of the stator core 310 such that the first motor housing 190a and the stator 300 are connected, and the second motor housing 190b and the stator 300 are connected. Also, housing penetration holes may be formed at the first motor housing 190a and the second motor housing 190b to coincide with the first insertion holes of the stator core 310 such that the first motor housing 190a, the second motor housing 190b, and the stator 300 are connected by one fastening member.

The plurality of teeth 350 may be positioned in the stator core 310 divided by the stator core 310 and may divide a space inside the stator core 310 as a plurality of slots along the circumferential direction. Also, the teeth 350 may provide spaces in which the coils 340 will be disposed, and may be magnetized to one of an N-pole and an S-pole by a magnetic field formed due to power supplied to the coils 340.

In addition, the teeth 350 may have a Y-shape, and surfaces adjacent to the rotor 200 among the outer surfaces of the teeth 350 may have a gently curved surface such that an attractive force and a repulsive force which interact with a concentrated magnetic flux core 235 in the rotor 200 are efficiently generated. Other than the above, various structures may be used as an example of a structure of the teeth 350 to provide the space in which the coils 340 are disposed and efficiently generate the attractive force and the repulsive force which interact with the concentrated magnetic flux core 235.

The coils 340 may be disposed at the insulators 320 disposed on the teeth 350 of the stator 300 and form a magnetic field due to the power applied thereto. By this, the coils 340 may magnetize the teeth 350 at which the coils 340 are disposed.

In addition, the power supplied to the coils 340 may be a three-phase form or a single-phase form.

For example, when the power supplied to the coils 340 is the three-phase form, three pairs of coils 340 illustrated in FIG. 3 may be grouped to supply U-phase power, other three pairs of coils 340 may be grouped to supply V-phase power, and remaining three pairs of coils 340 may be grouped to supply W-phase power.

Other than the above, various combinations of the coils 340 may be used as an example of a combination of the coils 340 to control the rotation of the rotor 200 and enable the attractive force and the repulsive force to efficiently interact between the rotor 200 and the magnetic field of the stator 300.

In addition, the coils 340 may be wound by a concentrated winding method and a distributed winding method. The concentrated winding method is a method of winding the coils 340 such that a number of slots at one pole per phase become one, and the distributed winding method is a method of winding the coils 340 by dividing the coils 340 into two or more slots in an electric device to which slots are attached. Other than the above, various methods may be used as an example of a method of winding the coils 340 to efficiently magnetize the teeth 350.

Furthermore, materials used in the coils 340 may be copper, aluminum, or a composite material of copper and aluminum. Other than the above, various materials may be used as an example of materials of the coils 340 to efficiently magnetize the teeth 350.

The insulators 320 are insulation members to prevent a material of the stator 300 which has electromagnetic conductivity from coming in contact with the coils 340 and being conducted. The insulators 320 may be divided as first insulators 320a and second insulators 320b.

The first insulators 320a and the second insulators 320b are formed of materials having electrical insulation, and are respectively disposed at both sides of the stator core 310 with respect to the axial direction. The first insulators 320a and the second insulators 320b are respectively coupled to both sides of the stator core 310 to cover the stator 300.

In addition, second insertion protrusions which protrude toward the stator core 310 may be formed at the first insulators 320a and the second insulators 320b, and the second insertion protrusions may be inserted into second insertion holes formed at the stator core 310.

The first insulators 320a and the second insulators 320b may include ring-shaped edges, a plurality of coil support units arranged corresponding to the stator core 310, and coil guide units protruding from radial inner portions and outer portions of the coil support units.

In addition, the coil support units may be spaced apart along the circumferential direction, and spaces corresponding to the slots of the stator 300 may be formed between the coil support units.

The fixing protrusions 360 may provide the fixing force such that the stator 300 is fixed instead of rotating in the second housing despite the rotary force generated due to the attractive force and the repulsive force between a magnetic field formed due to the power applied to the coils 340 and a magnetic field formed due to permanent magnets 280.

In addition, the fixing protrusions 360 may be formed at an outer partition of the stator core 310 to be perpendicular or parallel to the shaft 400 in order to be coupled to grooves of the motor housing 190. Other than the above, various forms may be used as an example of the fixing protrusions 360 to fix the stator 300 to the motor housing 190.

The shaft 400 may be connected to a shaft insertion hole 215 of the rotor 200 in order to rotate together with the rotor 200. One end of the shaft 400 may be rotatably supported at the second motor housing 190b through a bearing 130, and the other end of the shaft 400 may be rotatably supported at the first motor housing 190a using the bearing 130. Also, the one end of the shaft 400 supported at the second motor housing 190b may protrude to the outside of the motor housing 190 through an opening 180 formed at the second motor housing 190b in order to be connected to a device requiring a driving force.

The rotor 200 is a device which acquires a rotary force of the motor 100 by the attractive force and the repulsive force interacting between the magnetic field due to the permanent magnets 280 and the magnetic field formed at the teeth 350 of the stator 300. The rotor 200 may be disposed inside the stator 300, a first rotor housing 290a and a second rotor housing 290b may be provided at a transverse surface of the rotor 200, and a third rotor housing 290c may be provided at an axial surface of the rotor 200. The rotor 200 may include a rotor core 210 and the permanent magnets 280.

The rotor 200 may include the rotor core 210 to concentrate a passage and magnetic flux of the magnetic field formed by the permanent magnets 280 and to prevent scattering, a rotor housing 290 to surround the rotor core 210 to prevent deviation of the permanent magnets 280, and the permanent magnets 280 to form the magnetic field.

In addition, the rotor core 210 may include a main core 220, a radial core 225, the concentrated magnetic flux core 235, an inner coupling unit 240, an inner magnetic flux leak prevention unit 250, an outer coupling unit 245, an outer magnetic flux leak prevention unit 255, a permanent magnet mounting unit 230, and a coupling hole 260.

The main core 220 may have a cylindrical shape and the shaft insertion hole 215 connected to the shaft 400 may be provided therein.

In addition, the main core 220 may form the frame of the rotor 200 such that the shape of the rotor 200 is maintained from the stress acting on the rotor 200 during the rotation of the rotor 200. Also, the main core 220 may provide a path of the magnetic field formed by the permanent magnets 280 to enable the magnetic flux to flow along the main core 220.

The radial core 225 may be coupled to the main core 220 in a form of being radiated to the outside to be perpendicular to the circumferential direction of the rotor 200. The radial core 225 may provide a passage such that the magnetic flux flows along the magnetic field formed due to a pair of permanent magnets 280 abutting the radial core 225, and may be electromagnetically connected to the main core 220 to increase the q-axis inductance.

In addition, a width of the radial core 225 may be fixed such that a pair of permanent magnets 280 are abuttingly disposed in parallel, and a width of a radial core 225 outside the circumference may be larger than a width of the radial core 225 inside the circumference such that the one pair of permanent magnets 280 are abuttingly disposed in preset angles (e.g., 20°). Other than above, various shapes may be used as an example of the shape of the radial core 225 to dispose one pair of permanent magnets 280.

The concentrated magnetic flux core 235 induces the magnetic field formed by the permanent magnets 280 disposed at both sides of the concentrated magnetic flux core 235 to be formed at the concentrated magnetic flux core 235 and to concentrate the magnetic flux.

Also, as illustrated in FIG. 4, the concentrated magnetic flux core 235 may have a fan shape. Also, a radius of the fan shape may be different from or the same as a radius of the rotor 200.

The inner coupling unit 240 reduces scattering of the concentrated magnetic flux core 235 due to a centrifugal force generated toward the outside from the center of the rotor 200 during the rotation of the rotor 200. Specifically, the inner coupling unit 240 is disposed between an inside of the concentrated magnetic flux core 235 and an outside of the main core 220, and is coupled to the inside of the concentrated magnetic flux core 235 and the outside of the main core 220. Accordingly, the inner coupling unit 240 decreases a displacement generated by the concentrated magnetic flux core 235 moving toward the outside due to the centrifugal force, thereby reducing scattering of the concentrated magnetic flux core 235.

The inner magnetic flux leak prevention unit 250 may be disposed at both sides of the inner coupling unit 240 to reduce leakage of the magnetic flux introduced into or discharged from the permanent magnets 280. Specifically, the inner magnetic flux leak prevention unit 250 may be provided between the inside of the permanent magnets 280 toward the center of the rotor 200 and an outside of the main core 220, and a nonmagnetic material such as plastic or air may be filled therein to reduce the leakage of the magnetic flux formed by the permanent magnets 280 to the main core 220.

The outer coupling unit 245 reduces scattering of the concentrated magnetic flux core 235, the radial core 225, and the permanent magnets 280 due to the centrifugal force generated toward the outside from the center of the rotor 200 during the rotation of the rotor 200. Specifically, the outer coupling unit 245 is disposed between the radial core 225 and the concentrated magnetic flux core 235 to be coupled to the radial core 225 and the concentrated magnetic flux core 235. Accordingly, the outer coupling unit 245 decreases displacements generated by the concentrated magnetic flux core 235, the radial core 225, and the permanent magnets 280 moving toward the outside due to the centrifugal force, thereby reducing scattering of the concentrated magnetic flux core 235, the radial core 225, and the permanent magnets 280.

The outer magnetic flux leak prevention unit 255 may be disposed at the outside of the permanent magnets 280 and reduce the leakage of the magnetic flux introduced into and discharged from the permanent magnets 280. Specifically, the outer magnetic flux leak prevention unit 255 may be provided between the outside of the permanent magnets 280 and the inside of the outer coupling unit 245, and the nonmagnetic material may be filled therein as in the inner magnetic flux leak prevention unit 250 to reduce the leakage of the magnetic flux formed by the permanent magnets 280 to the main core 220.

A soft magnetic material and metal may be used as materials of the main core 220, the radial core 225, the concentrated magnetic flux core 235, the inner coupling unit 240, and the outer coupling unit 245 to provide the path in which the magnetic flux flows and to have electrical conductivity. Other than the above, various materials having electromagnetic conductivity and not deformed due to an external stress may be used as an example of the materials of the main core 220, the radial core 225, the concentrated magnetic flux core 235, the inner coupling unit 240, and the outer coupling unit 245.

The permanent magnet mounting unit 230 provides a space in which the permanent magnets 280 will be magnetized by being disposed among two radial cores 225 respectively provided while spaced apart at both sides with respect to the concentrated magnetic flux core 235 and the concentrated magnetic flux core 235.

Specifically, as illustrated in FIG. 4, the permanent magnet mounting unit 230 is divided as a first permanent magnet mounting unit 230a and a second permanent magnet mounting unit 230b with respect to the concentrated magnetic flux core 235. Grooves of sizes corresponding to those of the permanent magnets 280 mounted thereon are formed at the permanent magnet mounting unit 230, and the permanent magnets 280 may be mounted on the grooves. The width of the grooves formed at the permanent magnet mounting unit 230 may be larger than the widths of the inner magnetic flux leak prevention unit 250 and the outer magnetic flux leak prevention unit 255. Also, the grooves formed at the permanent magnet mounting unit 230 may be formed parallel with respect to the radial core 225, or formed between the permanent magnet mounting unit 230 and the radial core 225 to have a preset angle. The preset angle may be a value set in accordance with the intensity of the magnetic flux to be concentrated and the q-axis inductance to be increased. For example, the preset angle may be a value equal to or less than 20°. Other than the above, various angles set in consideration of the intensity of the magnetic flux to be concentrated and the q-axis inductance to be increased may be used as an example of the preset angle.

Other than the above, various shapes may be used as an example of the shape of the permanent magnet mounting unit 230 to mount the permanent magnets 280.

Figure 6:
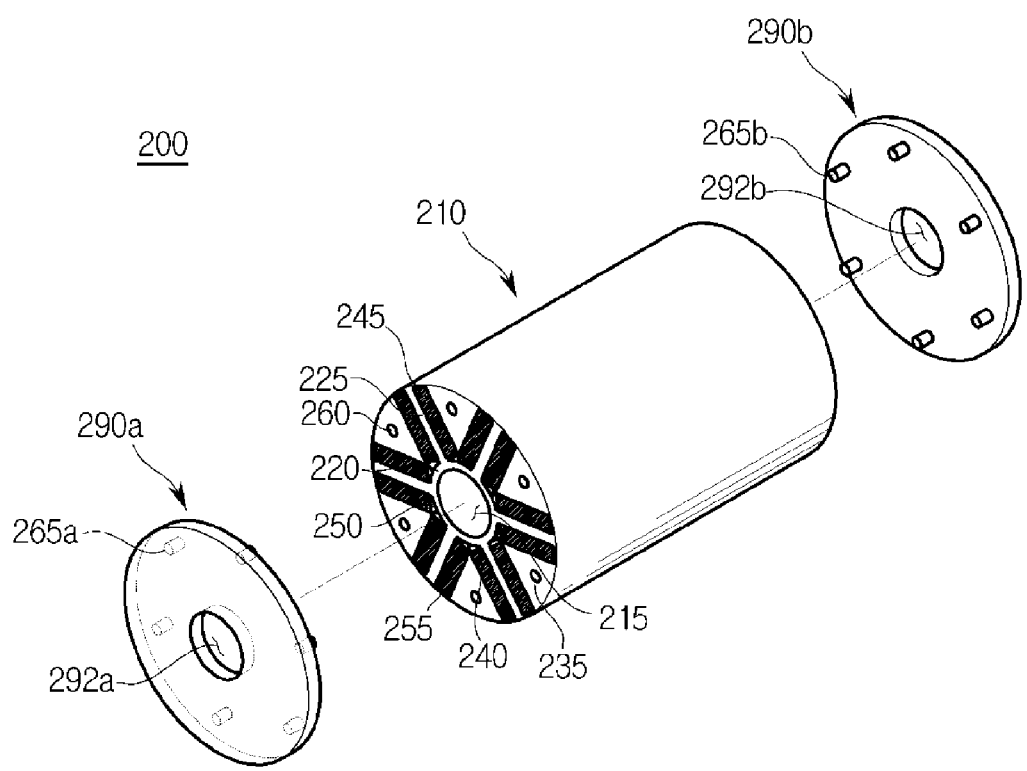
FIG. 6 is a perspective view of the rotor according to an embodiment.

FIG. 6 illustrates an exterior of a rotor to which a rotor housing is coupled.

A coupling hole 260 is formed to correspond to a coupling protrusion 265 of the rotor housing 290, and is a coupling member that allows the rotor housing 290 to be coupled to the rotor core 210. As illustrated in FIG. 6, the coupling hole 260 may be formed at the concentrated magnetic flux core 235, and the width of the coupling hole 260 may be equal to or larger than the width of the coupling protrusion 265. Also, the coupling hole 260 may have a cylindrical shape to correspond to the shape of the coupling protrusion 265, or have a polygonal column shape.

The rotor housing 290 is coupled to the rotor core 210 to prevent the permanent magnets 280 mounted on the permanent magnet mounting unit 230 from being discharged to the outside of the rotor core 210. Also, the rotor housing 290 may be divided as the first rotor housing 290a and the second rotor housing 290b with respect to the transverse axis.

A first coupling protrusion 265a corresponding to the shape of the coupling hole 260 may be provided at a connection side of the first rotor housing 290a, and a second coupling protrusion 265b corresponding to the shape of the coupling hole 260 may be provided at a connection side of the second rotor housing 290b.

In addition, a support hole 292 may be formed at centers of the first rotor housing 290a and the second rotor housing 290b such that the shaft 400 connected to the shaft insertion hole 215 is supported. Also, a radius of a first support hole 292a formed at the center of the first rotor housing 290a to support the shaft 400 may be smaller than a radius of the shaft insertion hole 215, and a radius of a connection side of the first support hole 292a may be smaller than a radius of the other side of the first support hole 292a. However, a radius of a second support hole 292b formed at the center of the second rotor housing 290b of a side at which the shaft 400 is connected to a device requiring a rotary force may be the same as or larger than the radius of the shaft insertion hole 215.

Although an interior permanent magnet (IPM) spoke type motor has been mainly described with reference to FIGS. 2 to 6 in the above, the motor is not limited to the IPM spoke type by the description. For example, the motor may be a surface attached type motor or a V-type motor.

Hereinafter, an embodiment of magnetization and magnetic flux concentration of the plurality of permanent magnets will be described with reference to FIGS. 7 to 9.

Hereinafter, driving power control and parameter estimation of the motor driving apparatus will be described with reference to FIGS. 7 to 9.

Figure 7:
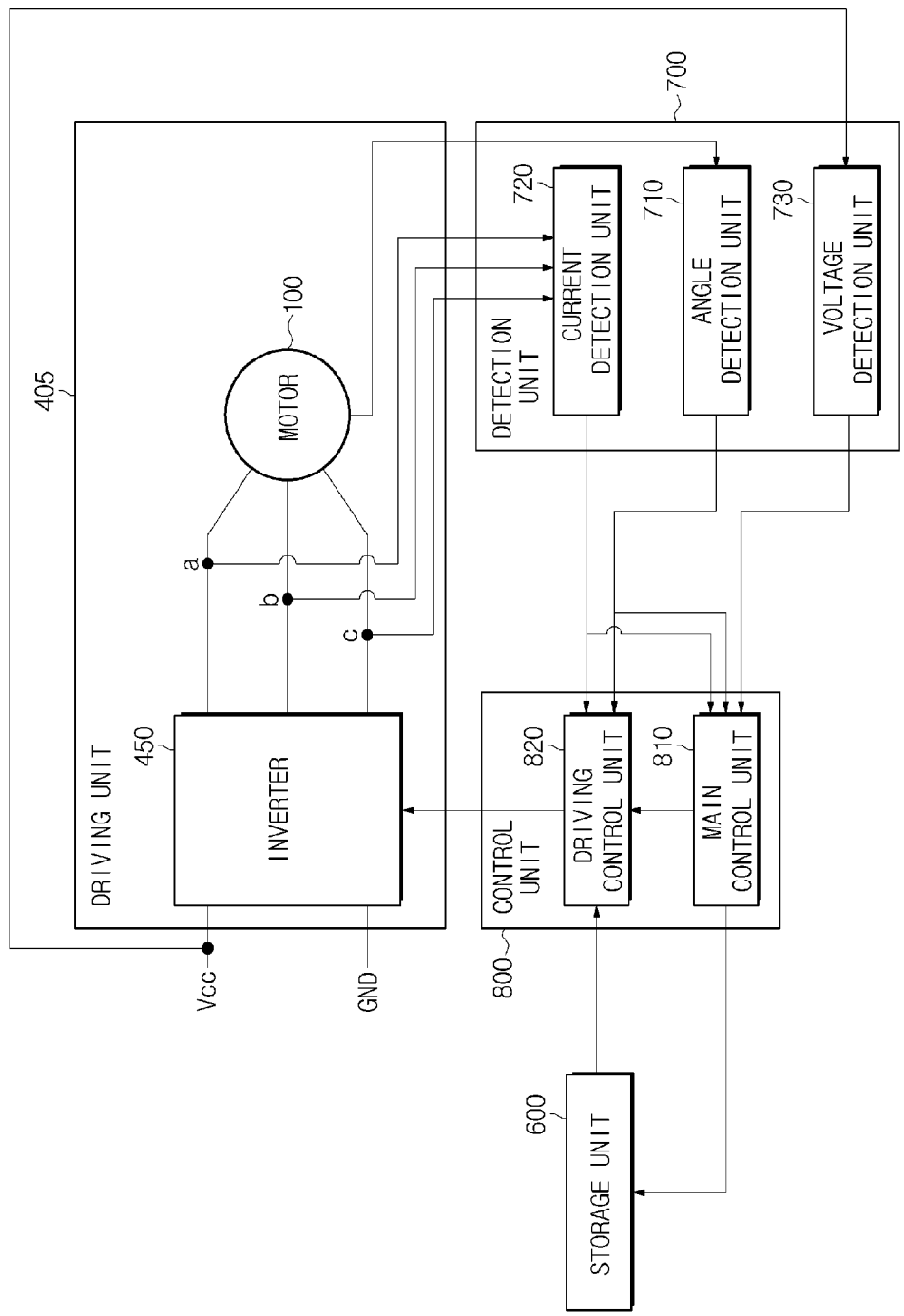
FIGS. 7, 8, and 9 are block diagrams of a driving unit, a detection unit, a storage unit, and a control unit of the motor driving apparatus according to an embodiment.
Figure 8:
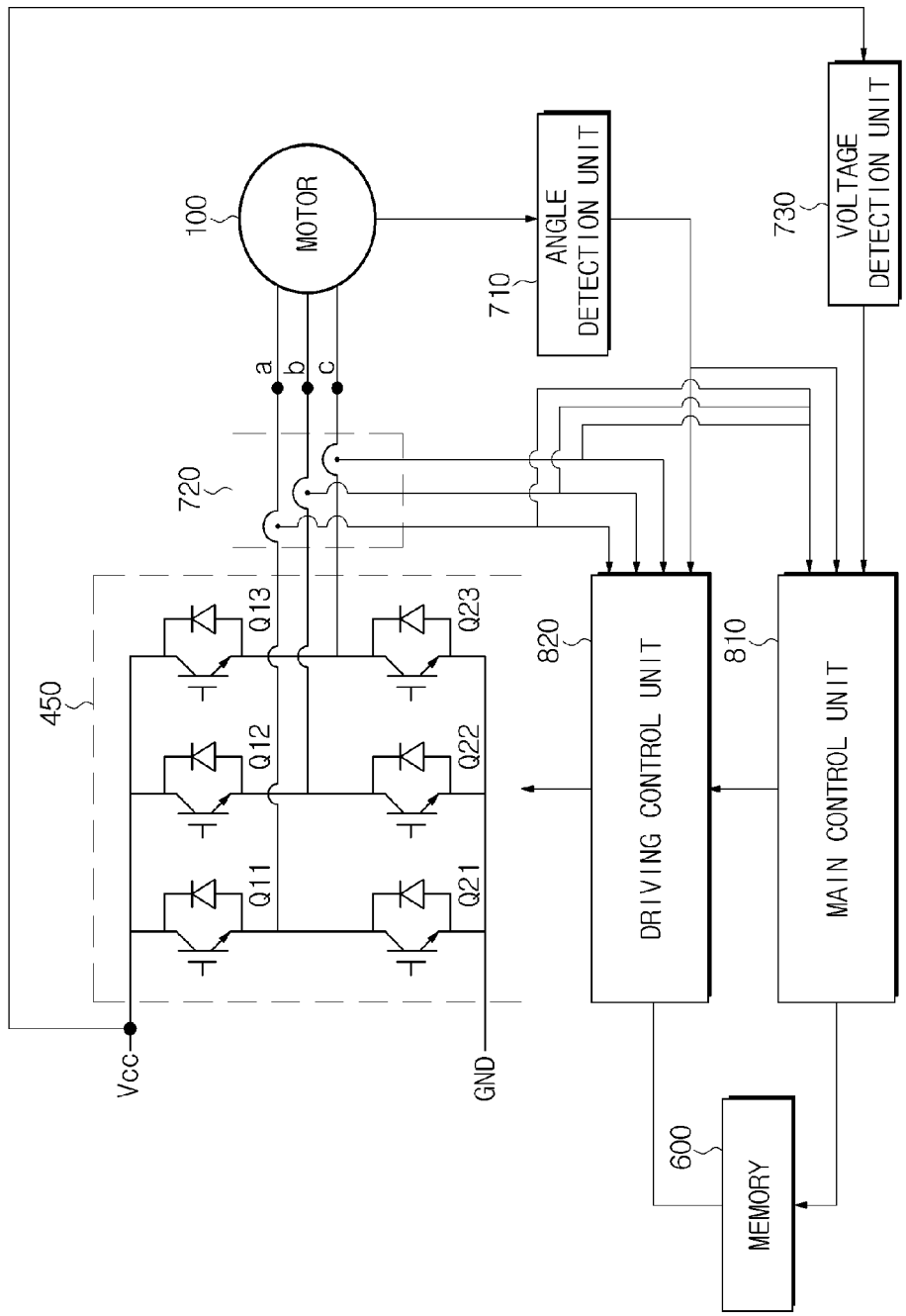
Figure 9:
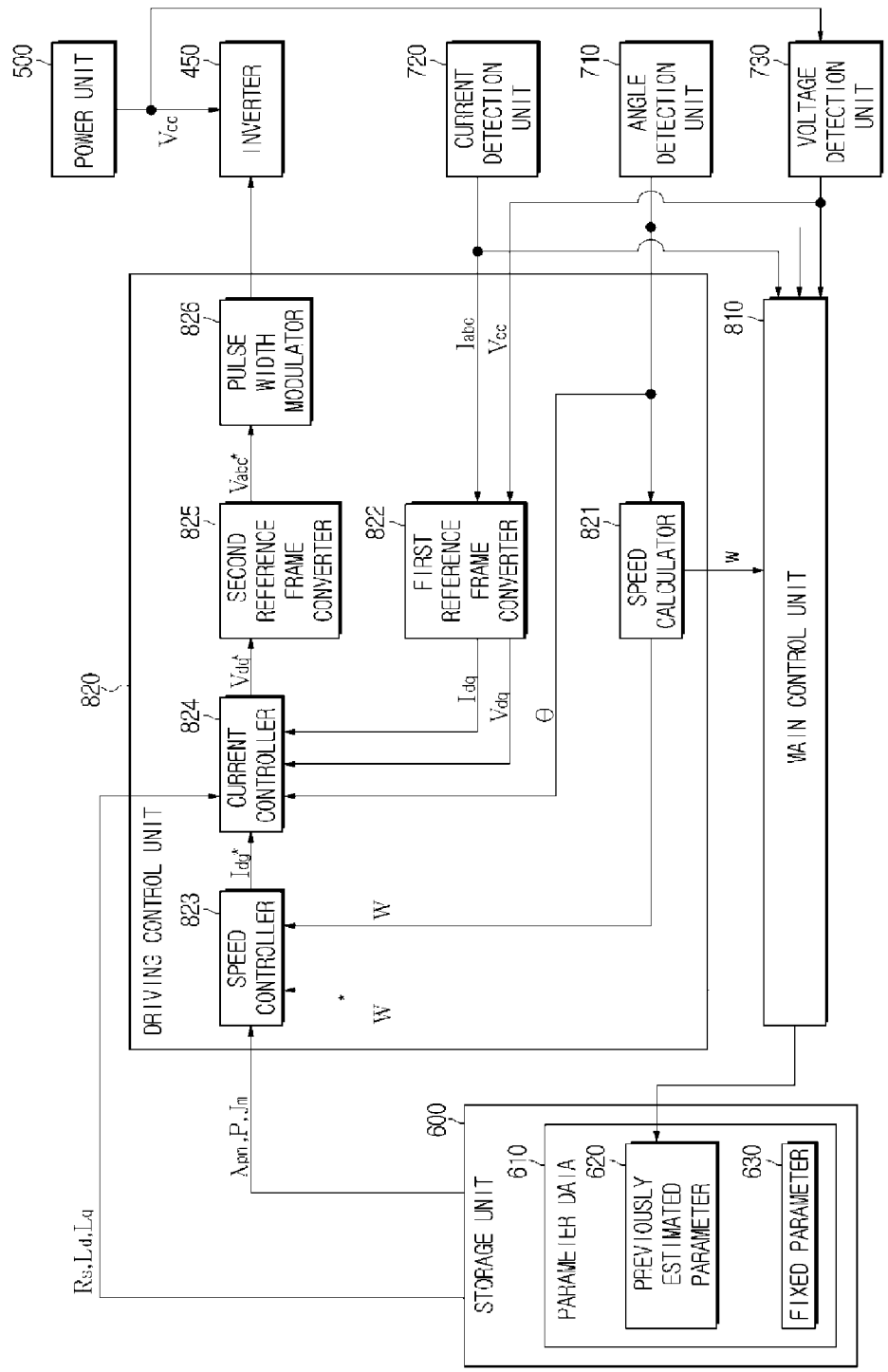

FIGS. 7 to 9 illustrate block diagrams of a driving unit, a detection unit, a memory, and a control unit of the motor driving apparatus.

The driving unit 404 may include the motor 100 to generate a rotary force, and the inverter 450 to supply driving current to the motor 100.

The motor 100 may be the same as or different from the motor 100 in FIGS. 2 to 6.

As illustrated in FIG. 8, the inverter 450 may include three upper end switching circuits Q11 to Q13 and three lower end switching circuits Q21 to Q23.

The upper end switching circuits Q11 to Q13 and the lower end switching circuits Q21 to Q23 may include a high voltage switch such as a high voltage bipolar junction transistor, a high voltage field effect transistor, or an insulated gate bipolar transistor (IGBT), and a freewheeling diode.

Specifically, the three upper end switching circuits Q11 to Q13 are connected in parallel to power Vcc, and the three lower end switching circuits Q21 to Q23 are connected in parallel to ground GND. Also, the three upper end switching circuits Q11 to Q13 and the three lower end switching circuits Q21 to Q23 are connected one-to-one in series, and three nodes to which the three upper end switching circuits Q11 to Q13 and the three lower end switching circuits Q21 to Q23 are connected may be respectively connected to three input terminals a, b, and c of the motor 100.

The inverter 450 turns on one of the upper end switching circuits Q11 to Q13 and one of the lower end switching circuits Q21 to Q23 according to a predetermined order, thereby supplying the driving current to the motor 100.

The detection unit 700 may include the angle detection unit 710 to detect the rotational displacement of the rotor 200, the current detection unit 720 to detect the current of driving power, and the voltage detection unit 730 to detect DC voltage which is a voltage signal transmitted to the inverter 450.

The detection unit 700 may be the same as the detection unit 700 described in FIG. 1.

The control unit 800 may include the main control unit 810 to generally control an operation of the motor driving apparatus 1, and the driving control unit 820 to control an operation of the driving unit 405.

The main control unit 810 may transmit a speed command w* to the driving control unit 820 in accordance with the user's operation command, and load the parameter data 610 in the storage unit 600 to transmit the parameter data 610 to the driving control unit 820. Particularly, the main control unit 810 receives the rotational displacement (e.g., an angle and a rotation speed) of the motor 100 detected by the detection unit 700 and the voltage command supplied to the inverter 450 in order to load a parameter for gain calculation in the current controller 824 and the speed controller 823 of the parameter data 610 stored in the storage unit 600. Also, the main control unit 810 transmits the parameter to the driving control unit 820 to calculate using the loaded parameter the voltage command to be transmitted to the inverter 450.

In addition, the main control unit 810 may estimate a parameter based on the rotation speed, the driving current, the voltage command, etc. detected by the detection unit 700. Also, the main control unit 810 may perform the parameter estimation by dividing the parameter estimation as startup estimation and driving estimation in accordance with the rotation speed of the motor 100 or whether a startup parameter is stored. Also, the main control unit 810 may perform the driving estimation by dividing the driving estimation as first driving estimation and second driving estimation in accordance with the rotation speed of the motor 100. The parameter estimation of the main control unit 810 will be described in detail with reference to FIGS. 10 to 14 below.

As illustrated in FIG. 9, the driving control unit 820 may include a speed calculator 821, the speed controller 823, a first reference frame converter 822, the current controller 824, a second reference frame converter 825, and a pulse width modulator 826.

The speed calculator 821 may calculate a rotation speed w of the motor 100 based on the rotation angle and the frequency of the rotor 200 provided by the angle detection unit 710 included in the motor 100, and provide the rotation speed w of the motor 100 to the speed controller 823 and the main control unit 810.

The speed controller 823 may calculate a dq-axis current command Idq* based on the speed command w* output by the main control unit 810, the rotation speed w of the motor 100 output by the speed calculator 821, the counter electromotive force constant estimated by the main control unit 810, and pre-stored motor inertia and the number of poles of the motor, and provide the dq-axis current command Idq* to the current controller 824.

The first reference frame converter 822 may convert driving current Iabc of the motor output by the current detection unit 720 to dq-axis current Idq based on the rotational displacement of the rotor 200 output by the angle detection unit 710, and provide the converted driving current Iabc to the current controller 824. Also, the first reference frame converter 822 may convert the DC power Vcc detected by the voltage detection unit 730 to driving voltage Vabc, and then convert the driving voltage Vabc to dq-axis voltage Vdq, and provide the converted driving voltage Vabc to the current controller 824.

The current controller 824 may calculate a dq-axis voltage command Vdq* based on the dq-axis current command Idq* output by the speed controller 823, the dq-axis current Idq output by the first reference frame converter 822, the phase resistance, d-axis inductance, and q-axis inductance estimated by the main control unit 810, and the rotational displacement of the rotor 200 detected by the angle detection unit 710, and provide the dq-axis voltage command Vdq* to the second reference frame converter 825.

The second reference frame converter 825 may convert the dq-axis voltage command Vdq* output by the current controller 824 to the driving voltage command Vabc* based on the rotational displacement of the rotor 200 output by the angle detection unit 710, and provide the converted dq-axis voltage command Vdq* to the pulse width modulator 826.

The pulse width modulator 826 may output a pulse width modulation signal to control the upper end switching circuits Q11 to Q13 and the lower end switching circuits Q21 to Q23 included in the inverter 450 based on the driving voltage command Vabc* output by the second reference frame converter 825.

In the above, the configuration of the motor driving apparatus has been described. Hereinafter, a method of estimating a parameter in a main control unit will be described with reference to FIGS. 10 to 13.

Figure 10:
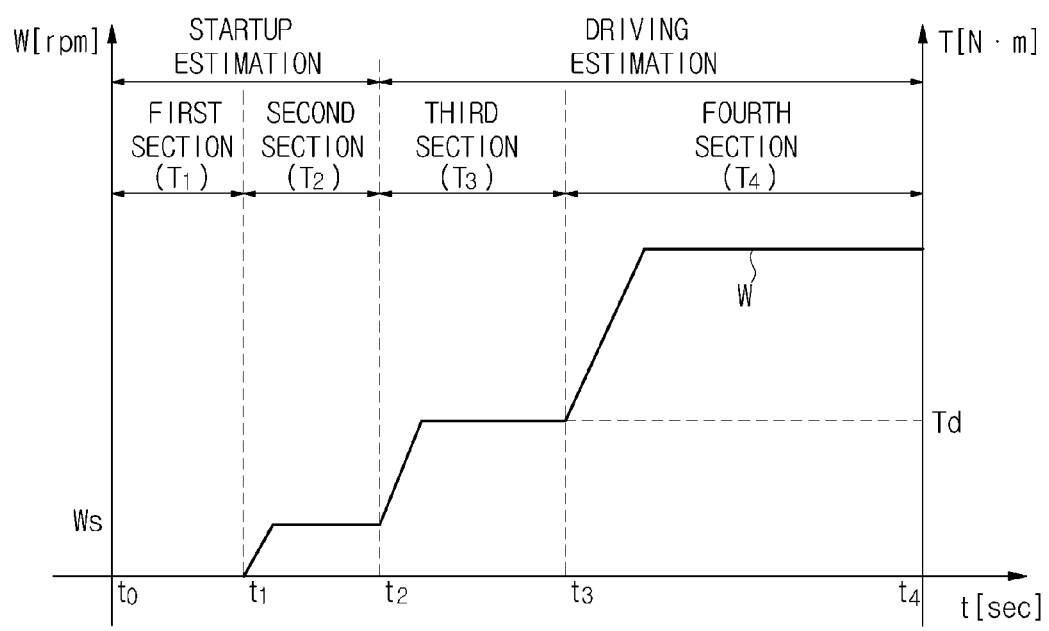
FIG. 10 is a graph illustrating an example of a parameter estimation method in accordance with a rotation speed and a torque of the motor.

FIG. 10 is a graph illustrating an example of a method of estimating a parameter in accordance with a rotation speed of the motor.

The parameter estimation of the motor 100 may include the startup estimation and the driving estimation.

The startup estimation is an estimation method of estimating a parameter in a region below a preset startup speed. Also, the startup estimation is a parameter estimation performed when information on a parameter is not stored in the storage unit 600 or a startup parameter is not fixed and thus it is difficult to use pre-stored data. Here, the preset startup speed is an upper-limit speed at which the startup estimation is performed before a driving operation, and the preset startup speed is a value determined when manufacturing or designing the motor 100 in accordance with the shape, the center of mass, performance, and driving power being supplied thereto of the motor 100.

In addition, the startup estimation may be divided as two sections by a parameter to be estimated or a rotation speed. That is, the startup estimation may include parameter estimation at a first section T1 where the motor is at standstill, and parameter estimation at a second section T2 where the motor rotates in a preset startup speed.

Specifically, parameters estimated in the first section T1 may be phase resistance, d-axis inductance, and q-axis inductance. The d-axis high-frequency test voltage and the q-axis high-frequency test voltage, which are high-frequency test voltages, may be first supplied to the d-axis and q-axis to estimate the d-axis inductance, the q-axis inductance, and the preliminary phase resistance. Also, first d-axis DC test current and second d-axis DC test current, which are different d-axis DC powers, may be first supplied by applying the estimated d-axis inductance, q-axis inductance, and preliminary phase resistance to estimate the phase resistance.

Here, the d-axis high-frequency test voltage, the q-axis high-frequency test voltage, the first d-axis DC test current, and the second d-axis DC test current are test powers supplied for estimating the phase resistance, the d-axis inductance, and the q-axis inductance, and are parameters in which the level, the frequency, and the supply time thereof are determined when manufacturing or designing the motor 100 within a range not significantly affecting the operation of the motor 100.

The phase resistance, the d-axis inductance, and the q-axis inductance may be estimated in the first section T1 using EQNS. (1) to (9) below.

$$V_d = R_s i_d + L_d \frac{di_d}{dt} \qquad \text{EQN. (1)}$$

EQN. (1) is a voltage equation of the d-axis at a standstill state. In EQN. (1), the d-axis voltage may be expressed as $V_d$, the preliminary phase resistance may be expressed as $R_s$, the d-axis current may be expressed as $i_d$, and the d-axis inductance may be expressed as $L_d$.

The d-axis high-frequency test power, $V_{td}*\sin(w_f t)$, may be supplied as the d-axis voltage.

$$V_q = R_s i_q + L_q \frac{di_q}{dt} \qquad \text{EQN. (2)}$$

EQN. (2) is a voltage equation of the q-axis at a standstill state. In EQN. (2), the q-axis voltage may be expressed as $V_q$, the preliminary phase resistance may be expressed as $R_s$, the q-axis current may be expressed as $i_q$, and the q-axis inductance may be expressed as $L_q$.

The q-axis high-frequency test power, $V_{tq}*\sin(w_f t)$, may be supplied as the q-axis voltage.

$$a = LPF(i_d * 2 \sin(w_f t)) \qquad \text{EQN. (3)}$$

EQN. (3) is an expression of the high-frequency test voltage and an in-phase parameter supplied to calculate the preliminary phase resistance, the d-axis inductance, and the q-axis inductance. In EQN. (3), the high-frequency test voltage and the in-phase parameter may be expressed as a, the low pass filter may be expressed as LPF, the frequency of the supplied high-frequency test voltage may be expressed as $w_f$, and the time may be expressed as t.

In addition, although EQN. (3) is an expression expressed in terms of the d-axis when the d-axis high-frequency test voltage is supplied, EQN. (3) may also be expressed by the d-axis substituted with the q-axis when the q-axis high-frequency test voltage is supplied.

$$b = LPF(i_d * 2 \cos(w_f t)) \qquad \text{EQN. (4)}$$

EQN. (4) is an expression of the high-frequency test voltage and a parameter at a right-angled phase supplied to calculate the preliminary phase resistance, the d-axis inductance, and the q-axis inductance. In EQN. (4), the high-frequency test voltage and the parameter at the right-angled phase may be expressed as b.

In addition, although EQN. (4) is an expression expressed in terms of the d-axis when the d-axis high-frequency test voltage is supplied, EQN. 4 may also be expressed by the d-axis substituted with the q-axis when the q-axis high-frequency test voltage is supplied.

$$R_s = \frac{a}{a^2 + b^2} V_{td} \qquad \text{EQN. (5)}$$

EQN. (5) is an expression for calculating the preliminary phase resistance. In EQN. (5), the level of the supplied d-axis high-frequency test voltage may be expressed as $V_{td}$.

Here, a and b are the same as a and b in EQN. (3) and EQN. (4).

$$L_d = \frac{b}{a^2 + b^2} V_{td} \qquad \text{EQN. (6)}$$

EQN. (6) is an expression for calculating the d-axis inductance.

Here, a and b are the same as a and b in EQN. (3) and EQN. (4).

$$L_q = \frac{b}{a^2 + b^2} V_{tq} \qquad \text{EQN. (7)}$$

EQN. (7) is an expression for calculating the q-axis inductance. In EQN. (7), the level of the supplied q-axis high-frequency test voltage may be expressed as $V_{tq}$.

Here, a and b are parameters in which the d-axis test voltage of EQN. (3) and EQN. (4) is substituted with the q-axis test voltage.

The d-axis inductance and the q-axis inductance estimated by supplying the high-frequency test voltage are not affected significantly by the frequency of the supplied high-frequency test voltage. This is because the d-axis inductance and the q-axis inductance are at the same term with the frequency in the voltage equation. However, since the phase resistance is at the real number side in the voltage equation, the phase resistance may relatively decrease due to an absolute value of an imaginary number side increasing as the frequency of the high-frequency test voltage increases. Accordingly, to estimate accurate phase resistance, the preliminary phase resistance, which is an approximate phase resistance, is estimated by supplying the high-frequency test voltage, and the current controller 824 is implemented using the estimated preliminary phase resistance, the d-axis inductance, and the q-axis inductance to estimate the accurate phase resistance using the d-axis DC power. Also, since the phase resistance is affected by nonlinearity of the inverter 450 by a parameter such as dead time when the phase resistance is estimated by supplying only one d-axis DC test current, more accurate phase resistance may be estimated when two d-axis DC test currents are supplied to estimate the phase resistance as in EQN. (8) to remove a parameter due to the nonlinearity.

$$V_d = R_s i_d + V_{offset} \qquad \text{EQN. (8)}$$

EQN. (8) is a voltage equation when the d-axis DC test current is supplied. In EQN. (8), the voltage due to the nonlinearity of the inverter 450 may be expressed as $V_{offset}$.

$$R_s = \frac{V_{d2} - V_{d1}}{i_{d2} - i_{d1}} \qquad \text{EQN. (9)}$$

EQN. (9) is an expression of the phase resistance calculated by supplying two DC test currents. In EQN. (9), the phase resistance is $R_s$, the first d-axis test current is $i_{d1}$, the voltage due to the first d-axis test current is $V_{d1}$, the second d-axis test current is $i_{d2}$, and the voltage due to the second d-axis test current may be expressed as $V_{d2}$.

The parameters estimated using EQNS. (1) to (9) in the first section T1 are the phase resistance, the d-axis inductance, and the q-axis inductance. The phase resistance, the d-axis inductance, and the q-axis inductance are parameters to implement the current controller 824. Since the counter electromotive force constant is used to implement the speed controller 823, a method of estimating the counter electromotive force constant in the second section T2 will be described with reference to EQNS. (10) to (15).

The control unit 800 performs torque control of fixed magnitude by supplying the d-axis current as OA and the q-axis current as a preset current value in order to rotate the motor while maintaining the preset startup speed. Also, the control unit 800 estimates the counter electromotive force constant based on the d-axis current, the d-axis voltage, the q-axis current, and the q-axis voltage when the motor maintains the preset startup speed. The estimation method will be described in detail with reference to EQNS. (10) to (15).

$$V_d^s = R_s I_d^s + \frac{d\lambda_d^s}{dt} \qquad \text{EQN. (10)}$$

EQN. (10) is a voltage equation of the d-axis at the preset startup speed. In EQN. (10), the d-axis voltage may be expressed as $V_d^s$, the phase resistance may be expressed as $R_s$, the d-axis current may be expressed as $I_d^s$, and the d-axis magnetic flux linkage may be expressed as $\lambda_d^s$.

$$V_q^s = R_s I_q^s + \frac{d\lambda_q^s}{dt} \qquad \text{EQN. (11)}$$

EQN. (11) is a voltage equation of the q-axis at the preset startup speed. In EQN. (11), the q-axis voltage may be expressed as $V_q^s$, the q-axis current may be expressed as $I_q^s$, and the q-axis magnetic flux linkage may be expressed $\lambda_q^s$.

$$\sqrt{\lambda_d^{s2} + \lambda_q^{s2}} = \sqrt{\lambda_d^{r2} + \lambda_q^{r2}} \qquad \text{EQN. (12)}$$

EQN. (12) is a relational expression between a magnetic flux linkage in a rest frame at standstill and a magnetic flux linkage in a rotating reference frame of a preset startup speed. In EQN. (12), the d-axis magnetic flux linkage in the rest frame may be expressed as $\lambda_d^s$, and the q-axis magnetic flux linkage in the rest frame may be expressed $\lambda_q^s$.

As shown in EQN. (12), it may be recognized that, when there is no magnetic flux leakage, an absolute value of the magnetic flux linkage in the rest frame is the same as an absolute value of the magnetic flux linkage in the rotating reference frame.

$$\lambda_q^{s2} = l_d^r L_d + \lambda_{pm} \qquad \text{EQN. (13)}$$

EQN. (13) is an expression of the d-axis magnetic flux linkage in the rotating reference frame. In EQN. (13), the counter electromotive force constant may be expressed as $\lambda_{pm}$.

$$\lambda_q^{r2} = l_q^r L_d \qquad \text{EQN. (14)}$$

EQN. (14) is an expression of the q-axis magnetic flux linkage in the rotating reference frame.

When EQN. (13) and EQN. (14) are substituted in EQN. (12) and simplified in terms of the counter electromotive force constant, it may be expressed as EQN. (15).

$$\lambda_{pm} = \lambda_d^{r2} + \lambda_q^{r2} - (l_q^r L_q)^2 \qquad \text{EQN. (15)}$$

EQN. (15) is an expression of the counter electromotive force constant.

EQN. (15) is a simplified equation of EQNS. 12 to 14, and the counter electromotive force constant calculated by EQN. (15) may be used to implement the speed controller 823 during the driving operation of the motor.

In the above, the startup estimation has been described with reference to EQNS. (1) to (15). Hereinafter, an embodiment of the driving estimation will be described with reference to FIGS. 11 to 13.

Figure 11:
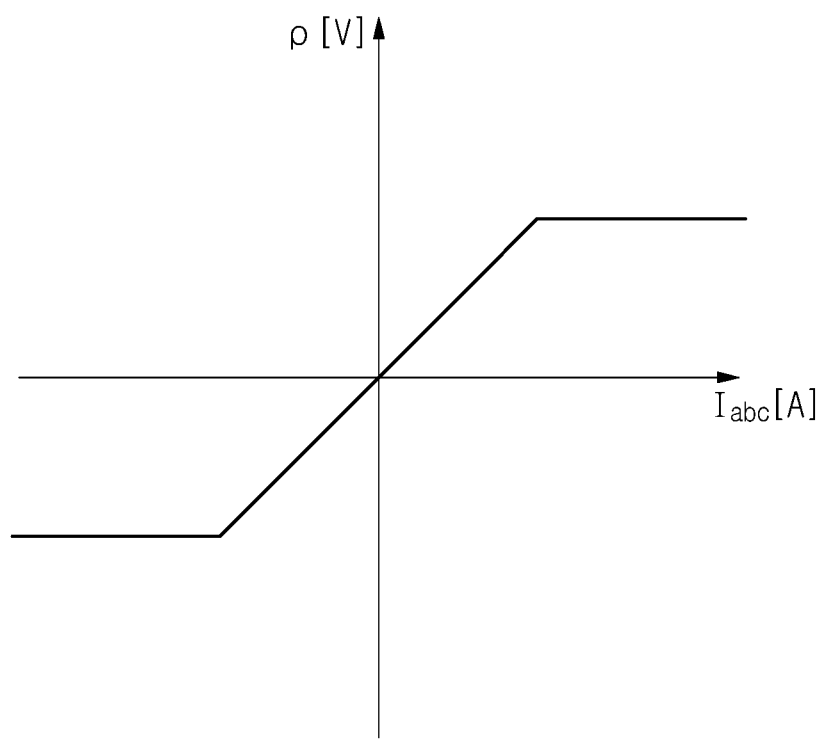
FIG. 11 is a graph showing an error between a command voltage and a driving voltage and a driving current of an inverter.
Figure 12A:
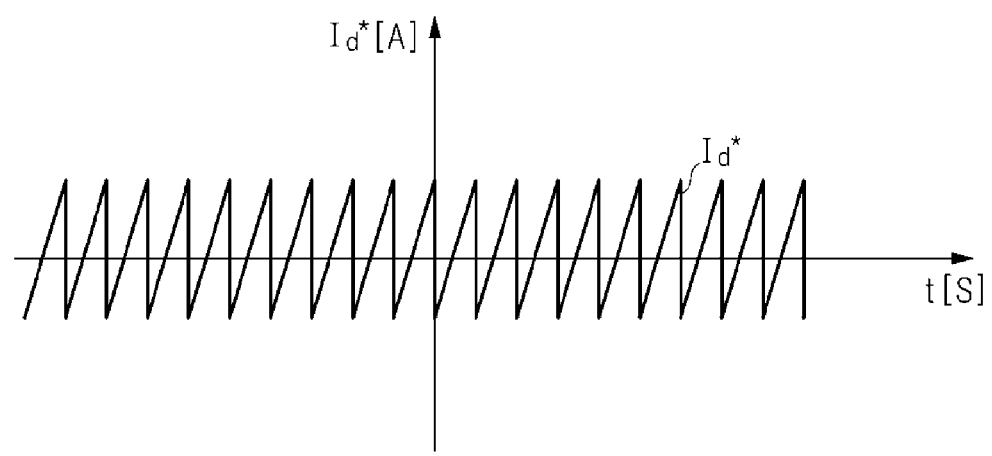
FIGS. 12A, 12B, 12C and 12D are graphs showing a command current and a driving current when compensating for a dead time according to an embodiment.
Figure 12B:
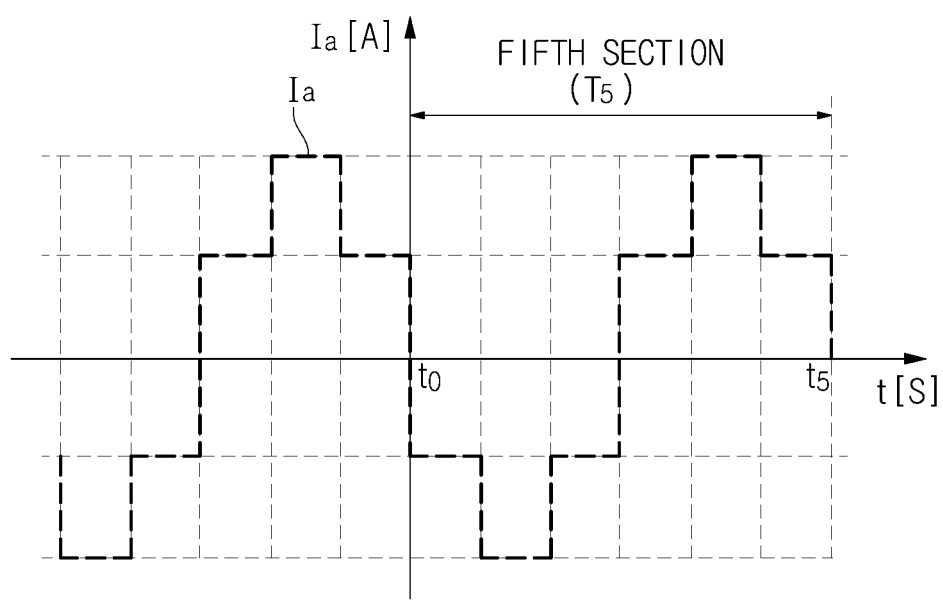
Figure 12C:
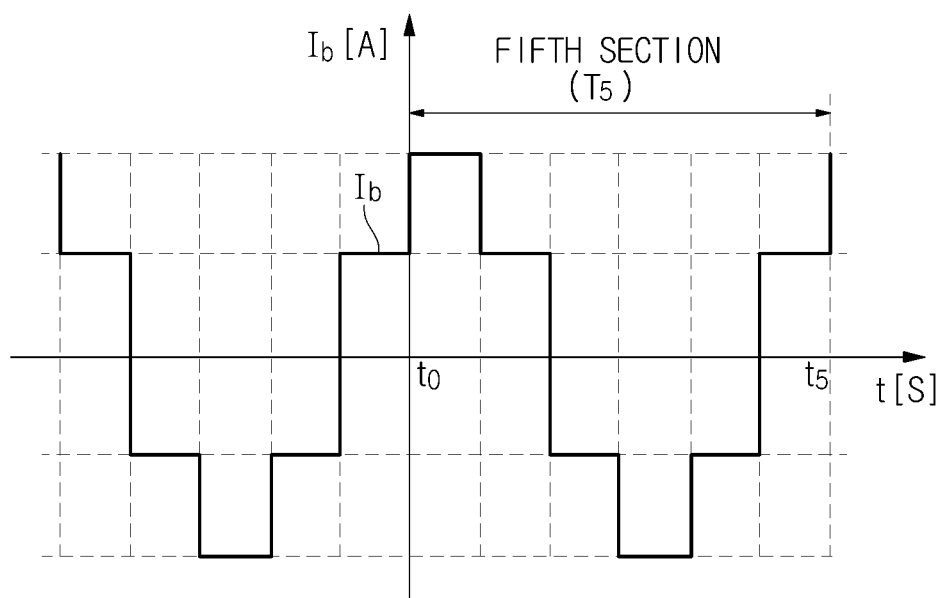
Figure 12D:
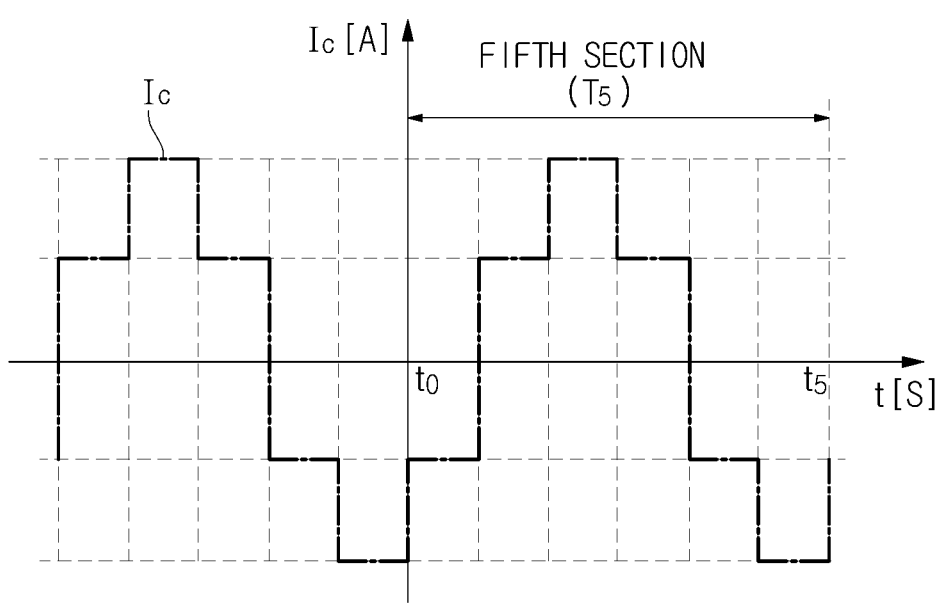

FIG. 11 is a graph showing an error between command voltage and driving voltage of an inverter and driving current. Also, FIG. 12A is a graph showing command current when compensating for a dead time, and FIGS. 12B to 12D are graphs showing three-phase driving currents when compensating for a dead time.

The driving estimation is a method of estimating a parameter when exceeding the preset startup speed in FIG. 10. In the operation estimation step, a parameter estimated in the startup estimation or a parameter estimated by the driving estimation in a previous degree may be used in the speed controller 823 and the current controller 824 for driving the motor 100.

Specifically, the driving estimation may include estimation at a third section T3 exceeding the preset startup speed and below a preset driving torque, and estimation at a fourth section T4 equal to or greater than the preset driving torque. The estimation at the third section T3 estimates a parameter while considering the dead time compensation, and the estimation at the fourth section T4 estimates a parameter without considering the dead time compensation.

The dead time is generated due to the nonlinearity of the inverter 450. Specifically, the dead time is generated due to reasons such as having a predetermined time interval between switching times in order to avoid short circuit of upper and lower switches in the inverter 450 such as a half bridge. As a result, as illustrated in FIG. 11, an error, which is a difference between the driving voltage and the voltage command input to the inverter 450, increases with the level of the driving current decreasing. In this case, since a previous current flowing direction is maintained due to a diode, the dead time is compensated using the polarity of the driving current. However, in the third section T3, the level of the driving current decreases due to a low speed, thus being difficult to determine the polarity. Accordingly, as illustrated in FIG. 12A, the control unit 800 supplies the current command $I_d^*$ in a saw tooth form, and the inverter 450 generates the driving current such that the driving currents Ia, Ib, and Ic have a step-like waveform in which a plurality of square waves are combined. When the driving currents Ia, Ib, and Ic are step-like composite square waves in the third section T3, a time for zero-crossing is shortened, and it may be easier to determine current polarity.

Here, the current command $I_d^*$ is controlled by the rotational displacement of the rotor 200 and a number of partitions per cycle. This will be described through EQN. 16.

$$I_d^* = -\frac{I_q^*}{2} + \frac{I_q^*}{60°}(\theta - 60°(n-1)) \qquad \text{EQN. (16)}$$

EQN. (16) is an expression of the d-axis current command in the saw tooth form. In EQN. (16), the d-axis current command may be expressed as $I_d^*$, the q-axis current command may be expressed as $I_q^*$, the angle of the rotor may be expressed as $\theta$, and the number of partitions per cycle may be expressed as n.

For example, as illustrated in FIGS. 12A to 12D, when the angle of the rotor is 180° and the number of partitions per cycle is 6, the d-axis current command is calculated as in FIG. 12A, such that the driving current in FIG. 12B, the driving current in FIG. 12C, and the driving current in FIG. 12D are supplied to the a-phase, the b-phase, and the c-phase, respectively, and determining the polarity of the driving current is facilitated.

In addition, a method of supplying test current and estimating a parameter in either the third section T3 or the fourth section T4 will be described with reference to FIG. 13.

Figure 13:
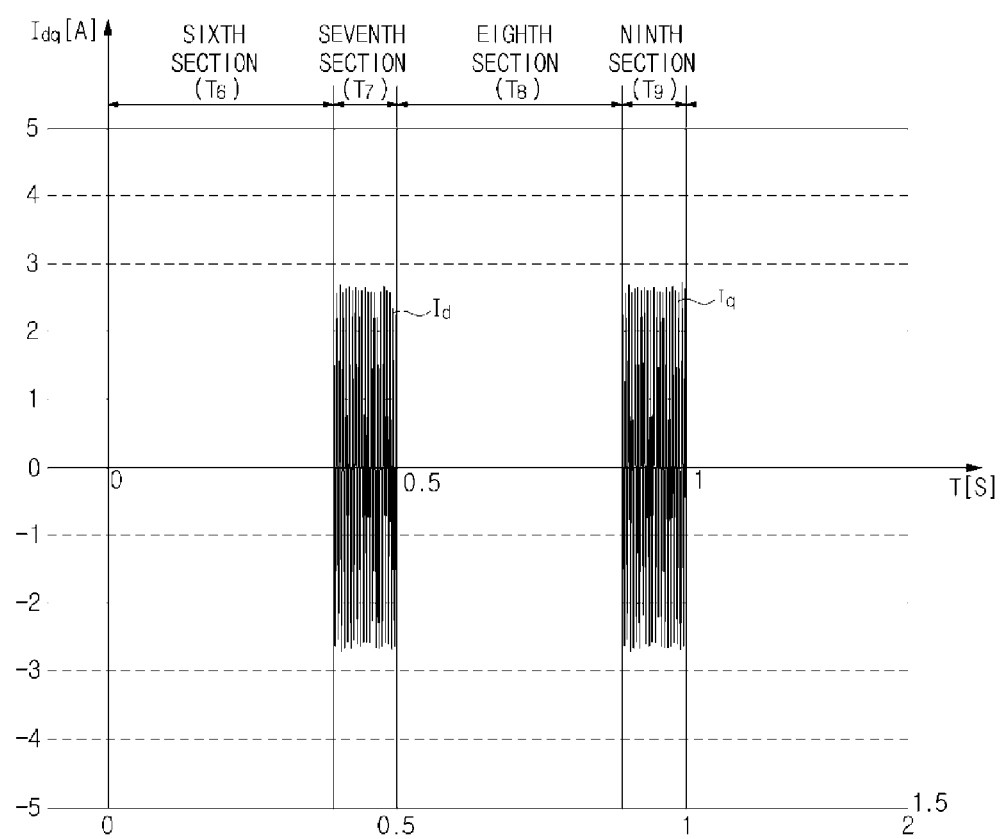
FIG. 13 is a graph of a test current supplied during driving estimation according to an embodiment.

FIG. 13 is a graph of the test current supplied during the driving estimation.

As illustrated in FIG. 13, the control unit 800 controls the inverter 450 to supply the d-axis driving test current and the q-axis driving test current for a preset amount of time. Specifically, one cycle include a sixth section T6 to a ninth section T9. The control unit 800 controls the inverter 450 to not supply the d-axis driving test current and the q-axis driving test current at the sixth section T6, to supply the d-axis driving test current at the seventh section T7, to not supply the d-axis driving test current and the q-axis driving test current at the eighth section T8, and to supply the q-axis driving test current at the ninth section T9.

In this case, the control unit 800 estimates at least one of the phase resistance and the counter electromotive force constant in at least one of the sixth section T6 and the eighth section T8 in which the d-axis driving test current and the q-axis driving test current are not supplied. For example, the control unit 800 may estimate the phase resistance and the counter electromotive force constant in the sixth section T6 or may estimate the phase resistance and the counter electromotive force constant in the eighth section T8. Also, the control unit 800 may estimate the phase resistance in the sixth section T6 and estimate the counter electromotive force constant in the eighth section T8. Also, the control unit 800 may estimate the counter electromotive force constant in the sixth section T6 and estimate the phase resistance in the eighth section T8.

In addition, the control unit 800 may estimate the d-axis inductance in the seventh section T7 in which the d-axis driving test current is supplied, and estimate the q-axis inductance in the ninth section T9 in which the q-axis driving test current is supplied.

FIG. 13 has illustrated by an example that the d-axis driving test current and the q-axis driving test current are sequentially and independently supplied. However, other than the above, the q-axis driving test current may be supplied first in one cycle and the d-axis driving test current may be supplied next, or sections in which the d-axis driving test current and the q-axis driving test current are supplied may be partially or completely overlap each other.

In addition, the seventh section T7, which is a time when the d-axis driving test current is supplied, and the ninth section T9, which is a time when the q-axis driving test current is supplied, may be the same or different from each other. Also, the seventh section T7, which is a time when the d-axis driving test current is supplied, and the ninth section T9, which is a time when the q-axis driving test current is supplied, are values preset when manufacturing or designing the motor 100, and may be determined while considering the size, shape, performance and a current state of the motor 100, and should not affect the driving of the motor 100 much. For example, the seventh section T7, which is a time when the d-axis driving test current is supplied, and the ninth section T9, which is a time when the q-axis driving test current is supplied, may be 0.02 [sec].

Hereinafter, the method of estimating a parameter in the driving estimation will be described with reference to EQNS. 17 to 24.

$$V_d = R_s i_d + \omega L_q i_q \qquad \text{EQN. (17)}$$

EQN. (17) is a d-axis voltage equation when the d-axis driving test current and the q-axis driving test current are not supplied and the current does not change.

In this case, the control unit 800 may calculate the phase resistance to be estimated using a recursive least square (RLS) algorithm.

$$Y(k)=V_d(k-1)+L_q I_q(k-1)\omega(k-1)$$

$$Z(k)=I_d(k-1)$$

$$\theta(k)=R_s \qquad \text{EQN. (18)}$$

EQN. (18) is an expression of estimating the phase resistance of the current degree using the RLS algorithm.

Here, the control unit 800 may load the data of a previous degree stored in the storage unit 600 or detected by the detection unit 700 to estimate the phase resistance of the current degree.

$$V_q=R_s i_q+\omega(L_d i_d+\lambda_{pm}) \qquad \text{EQN. (19)}$$

EQN. (19) is a q-axis voltage equation when the d-axis driving test current and the q-axis driving test current are not supplied and the current does not change.

In this case, as the phase resistance estimation, the control unit 800 may estimate the counter electromotive force constant using the RLS algorithm.

$$Y(k)=V_q(k-1)-R_s I_q(k-1)-L_d I_d(k-1)\omega(k-1)$$

$$Z(k)=I_q(k-1)$$

$$\theta(k)=\lambda_{pm} \qquad \text{EQN. (20)}$$

EQN. (20) is an expression of estimating the counter electromotive force constant of the current degree using the RLS algorithm.

Here, the control unit 800 may load the data of a previous degree stored in the storage unit 600 or detected by the detection unit 700, and estimate the counter electromotive force constant of the current degree based on the phase resistance estimated using EQN. (18) and EQN. (19).

$$V_d = R_s i_d + L_d \frac{d i_q}{dt} - \omega L_q i_q \qquad \text{EQN. (21)}$$

EQN. 21 is a d-axis voltage EQN. when the d-axis driving test current is supplied.

In this case, as the phase resistance estimation, the control unit 800 may estimate the d-axis inductance using the RLS algorithm.

$$Y(k) = I_d(k) + I_d(k-1) \qquad \text{EQN. (22)}$$

$$Z(k) = V_d(k) - R_d I_d(k-1) + L_d I_d(k-1)\omega(k-1)$$

$$\theta(k) = \frac{T_s}{L_d}$$

EQN. (22) is an expression of estimating the d-axis inductance of the current degree using the RLS algorithm. In EQN. (22), a difference of sampled times of the current degree and the previous degree may be expressed as $T_s$.

Here, the control unit 800 may load the data of the previous degree stored in the storage unit 600 or detected by the detection unit 700, and estimate the d-axis inductance of the current degree based on the phase resistance estimated using EQN. (18) and EQN. (19).

$$v_q = R_s i_q + L_q \frac{d i_q}{dt} + \omega(L_d i_d - \lambda_{pm}) \qquad \text{EQN. (23)}$$

EQN. (23) is a q-axis voltage equation when the q-axis driving test current is supplied.

In this case, as the phase resistance estimation, the control unit 800 may estimate the q-axis inductance using the RLS algorithm.

$$Y(k) = I_q(k) + I_q(k-1)$$
$$Z(k) = V_d(k) - R_d I_d(k-1) - \{L_d I_d(k-1) + \lambda_{pm}\}\omega(k-1)$$
$$\theta(k) = \frac{T_s}{L_q}$$
EQN. (24)

EQN. (24) is an expression of estimating the q-axis inductance of the current degree using the RLS algorithm. In EQN. (24), a difference of sampled times of the current degree and the previous degree may be expressed as $T_s$.

Here, the control unit 800 may load the data of the previous degree stored in the storage unit 600 or detected by the detection unit 700, and estimate the q-axis inductance of the current degree based on the phase resistance, the counter electromotive force constant, and the d-axis inductance estimated using EQNS. (18) to (22).

Hereinafter, a result of parameters estimated by the startup estimation and the driving estimation will be examined with reference to FIGS. 14 to 17.

Figure 14:
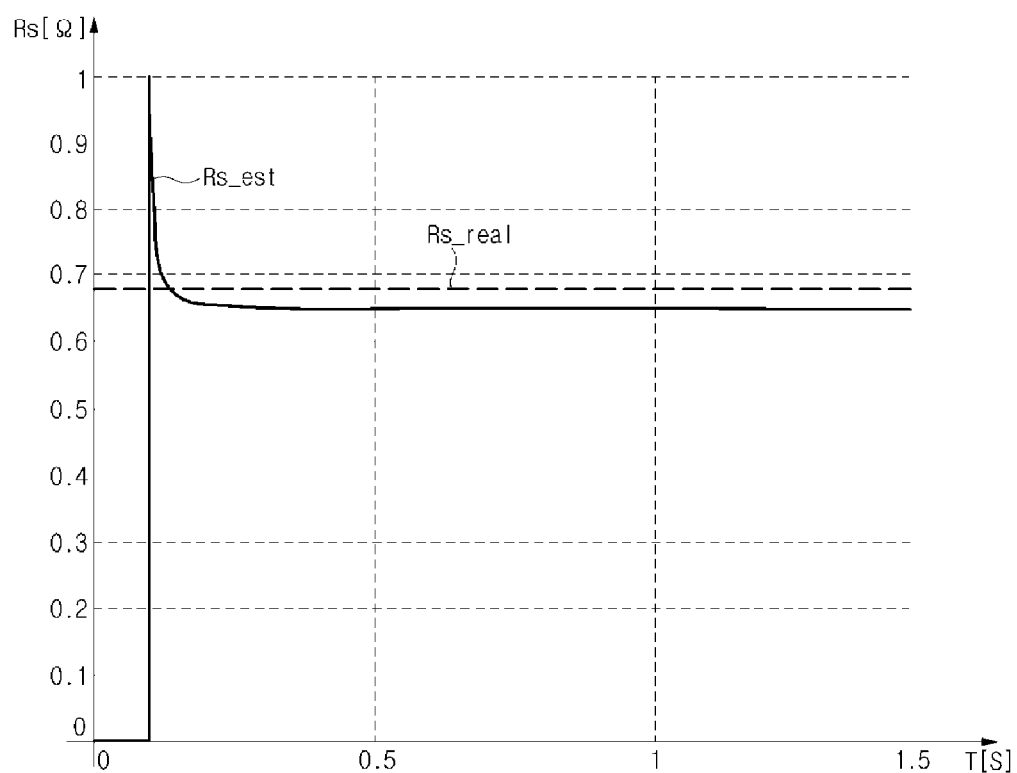
FIG. 14 is a graph of an estimated phase resistance and a real phase resistance according to an embodiment.
Figure 15:
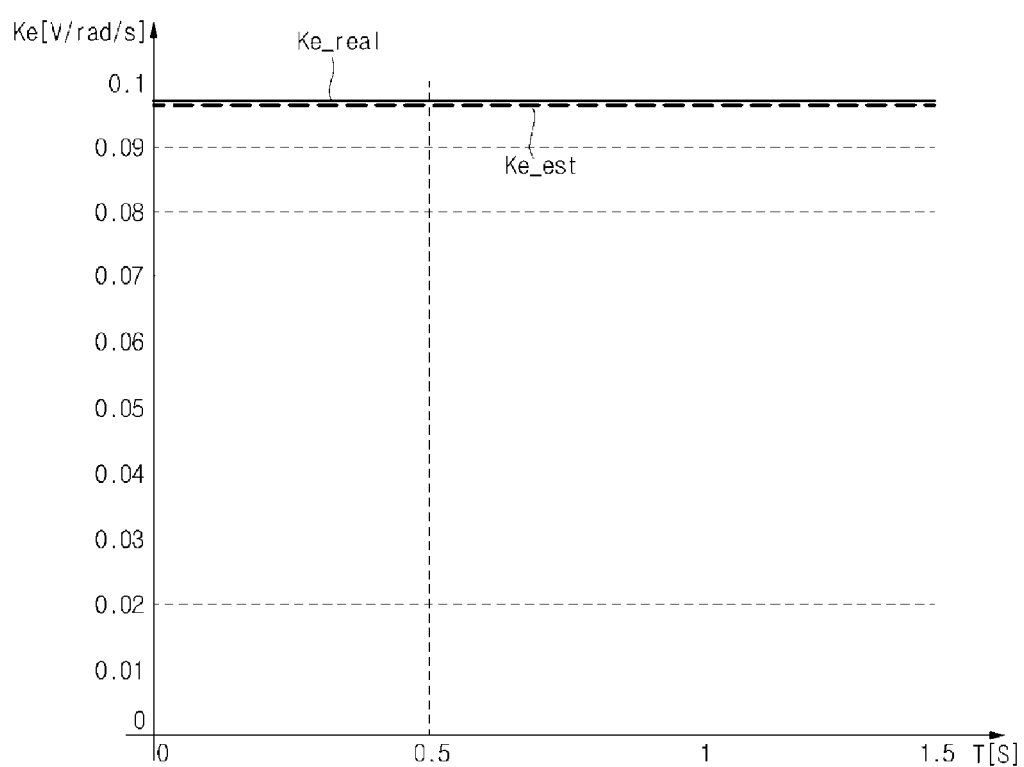
FIG. 15 is a graph of an estimated counter electromotive constant and a real counter electromotive constant according to an embodiment.
Figure 16:
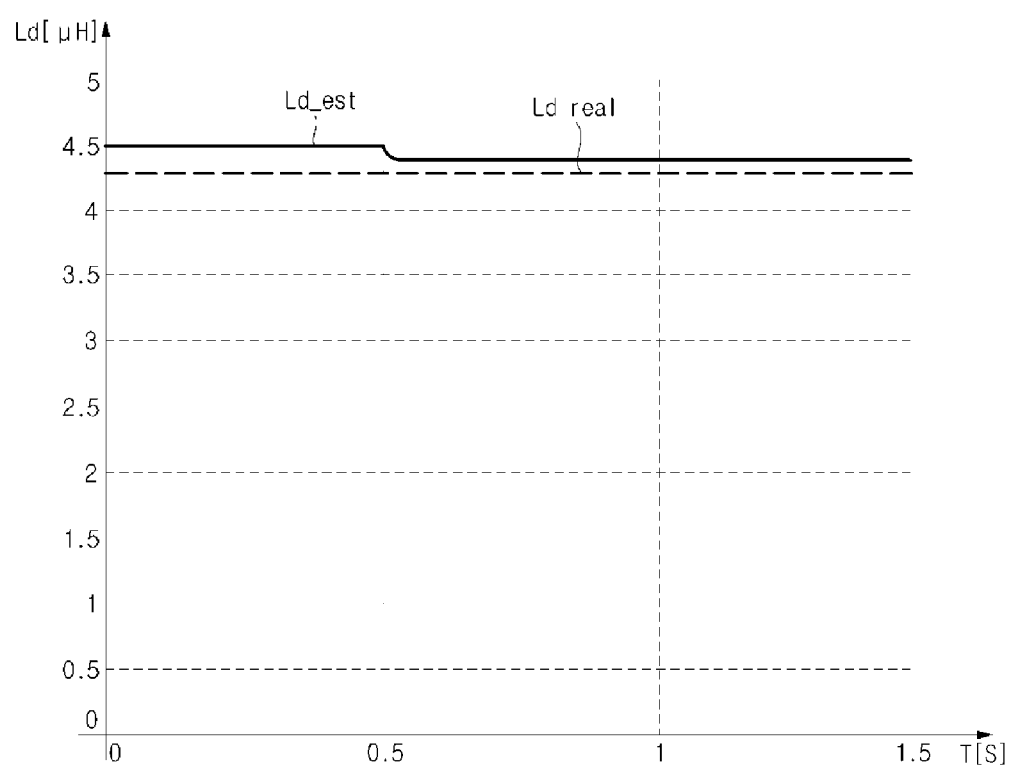
FIG. 16 is a graph of an estimated d-axis inductance and a real d-axis inductance according to an embodiment.
Figure 17:
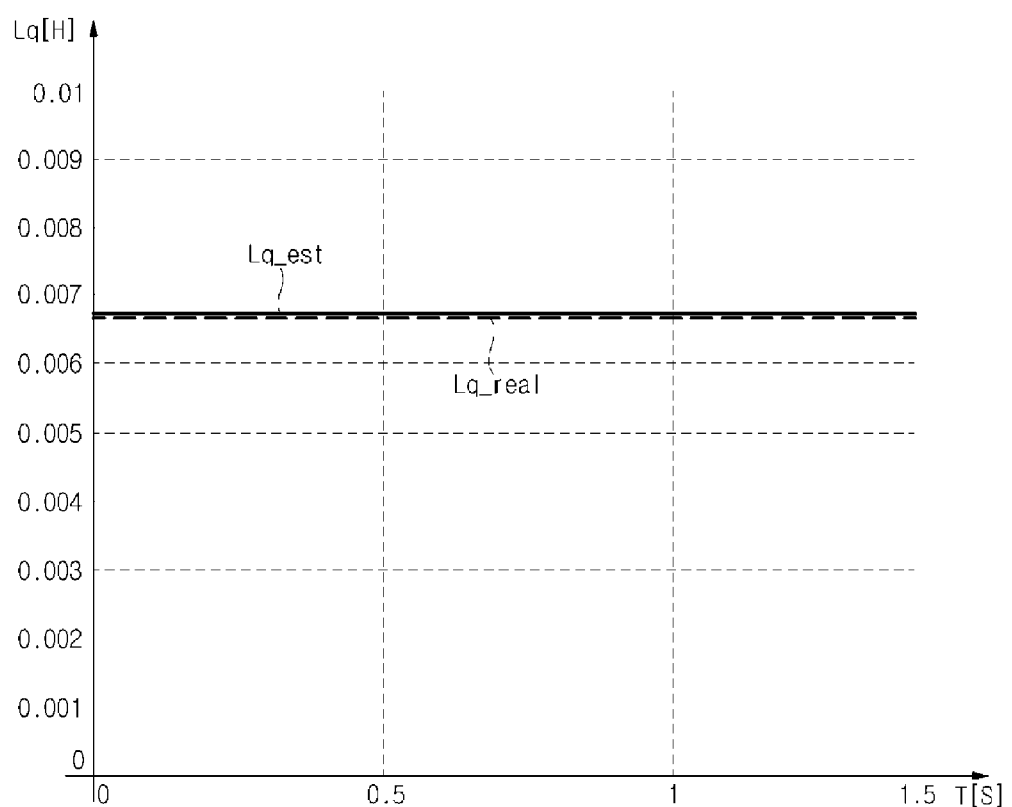
FIG. 17 is a graph of an estimated q-axis inductance and a real q-axis inductance according to an embodiment.

FIG. 14 is a graph of estimated phase resistance and real phase resistance, FIG. 15 is a graph of an estimated counter electromotive force constant and a real counter electromotive force constant, FIG. 16 is a graph of estimated d-axis inductance and real d-axis inductance, and FIG. 17 is a graph of estimated q-axis inductance and real q-axis inductance.

As shown in FIGS. 14 to 17, even though dividing into at least four sections in accordance with the rotation speed of the motor 100 described above causes an error to occur at a time of starting the estimation of the parameters by the startup estimation and the driving estimation, it can be recognized that the parameters become closer to the real parameters as the estimations are accumulated.

In the above, configurations and principles of estimating the parameters of the motor has been described. Hereinafter, a time sequential order of estimating the parameters will be described with reference to FIGS. 18 to 22.

Figure 18:
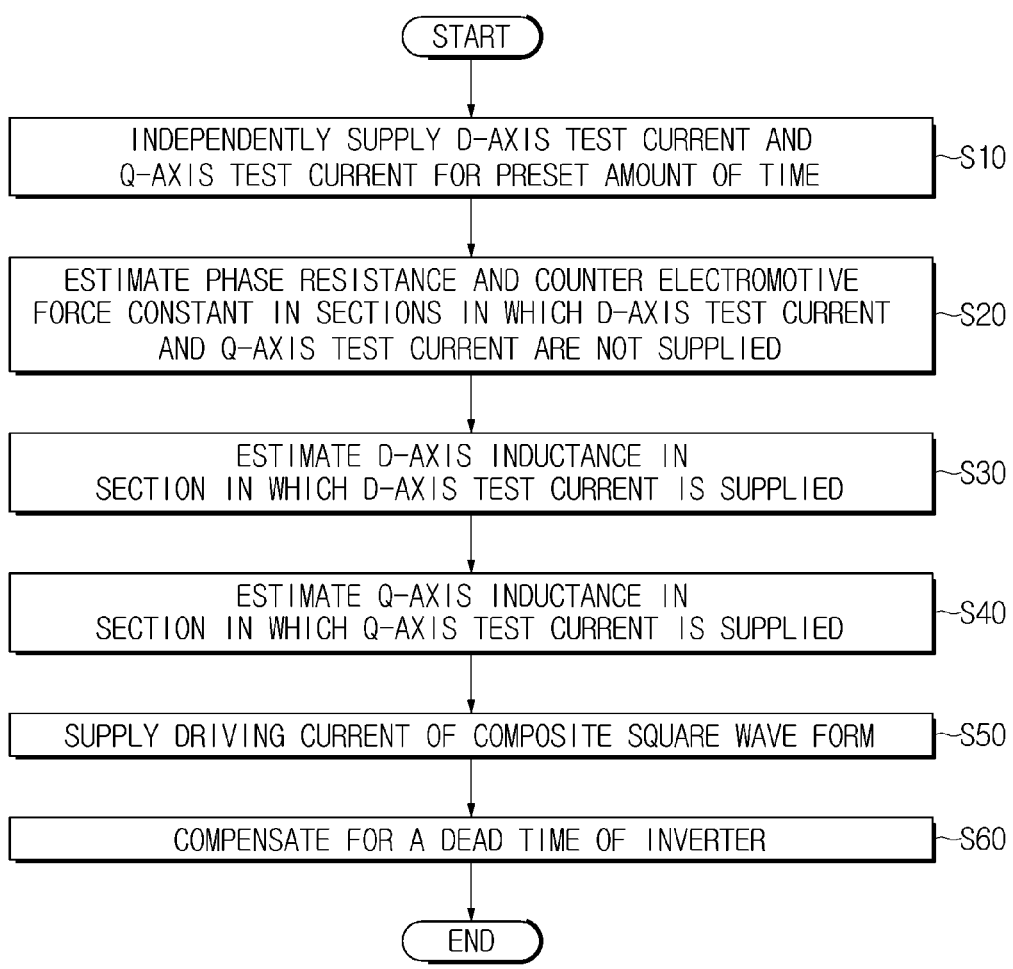
FIG. 18 is a flow chart of a method of estimating a parameter in the motor driving apparatus according to an embodiment.

FIG. 18 is a flow chart of a method of estimating a parameter in the motor driving apparatus according to an embodiment.

First, the control unit controls the inverter to independently supply the d-axis test current and the q-axis test current for a preset amount of time (S10).

Also, based on data detected by the detection unit or previously estimated data stored in the storage unit, the control unit estimates the phase resistance and the counter electromotive force constant in sections in which the d-axis test current and the q-axis test current are not supplied (S20).

In addition, based on the data detected by the detection unit or the previously estimated data stored in the storage unit, the control unit estimates the d-axis inductance in a section in which the d-axis test current is supplied (S30), and estimates the q-axis inductance in a section in which the q-axis test current is supplied (S40).

Lastly, the control unit supplies the driving current such that the driving current becomes the step-like composite square wave in order to facilitate the dead time compensation (S50), and compensates the dead time of the inverter based on the polarity of the driving current (S60).

Figure 19:
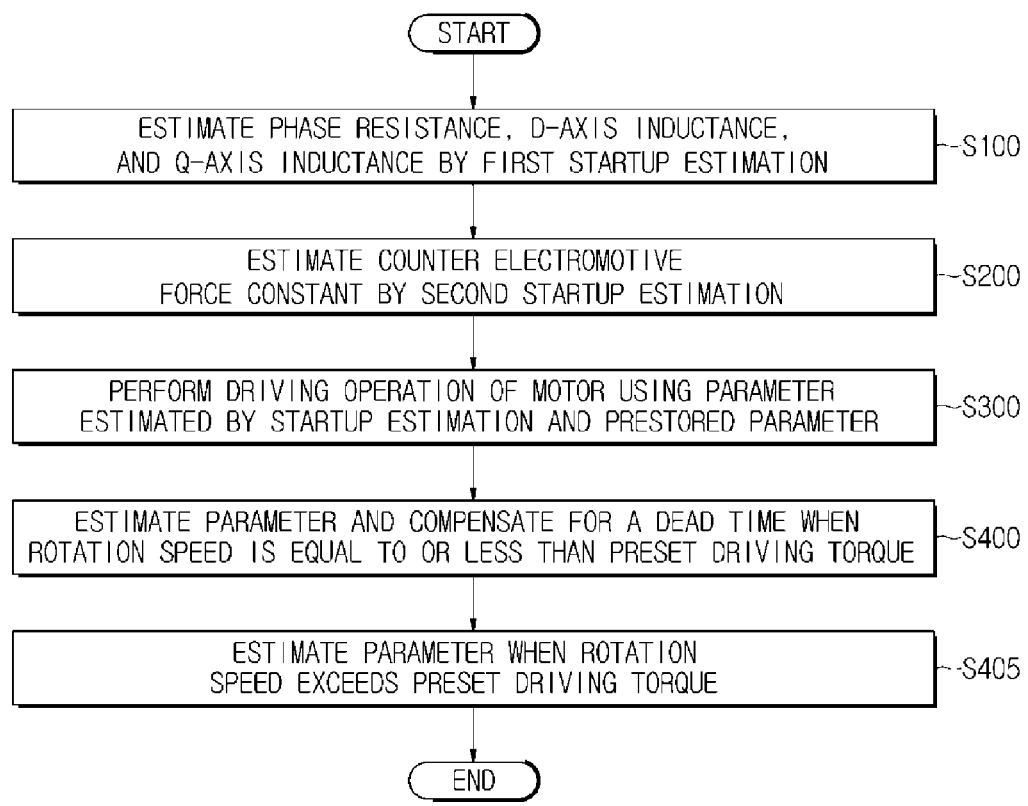
FIGS. 19, 20, 21, and 22 are flow charts of the method of estimating a parameter in the motor driving apparatus according to other embodiments.

FIG. 19 is a schematic flow chart of a method of estimating a parameter in the motor driving apparatus according to another embodiment.

First, the control unit estimates the phase resistance, the d-axis inductance, and the q-axis inductance by first startup estimation (S100). This will be described in detail with reference to FIG. 20.

In addition, the control unit estimates the counter electromotive force constant by second startup estimation (S200), and performs the driving operation of the motor using a parameter estimated by the startup estimation and a pre-stored parameter (S300). This will be described in detail with reference to FIG. 21.

Lastly, the control unit estimates the parameter while considering the dead time compensation when the torque of the motor is equal to or less than preset driving torque (S400), and estimates the parameter without considering the dead time compensation when the torque of the motor exceeds the preset driving torque (S405). This will be described in detail with reference to FIG. 22.

Figure 20:
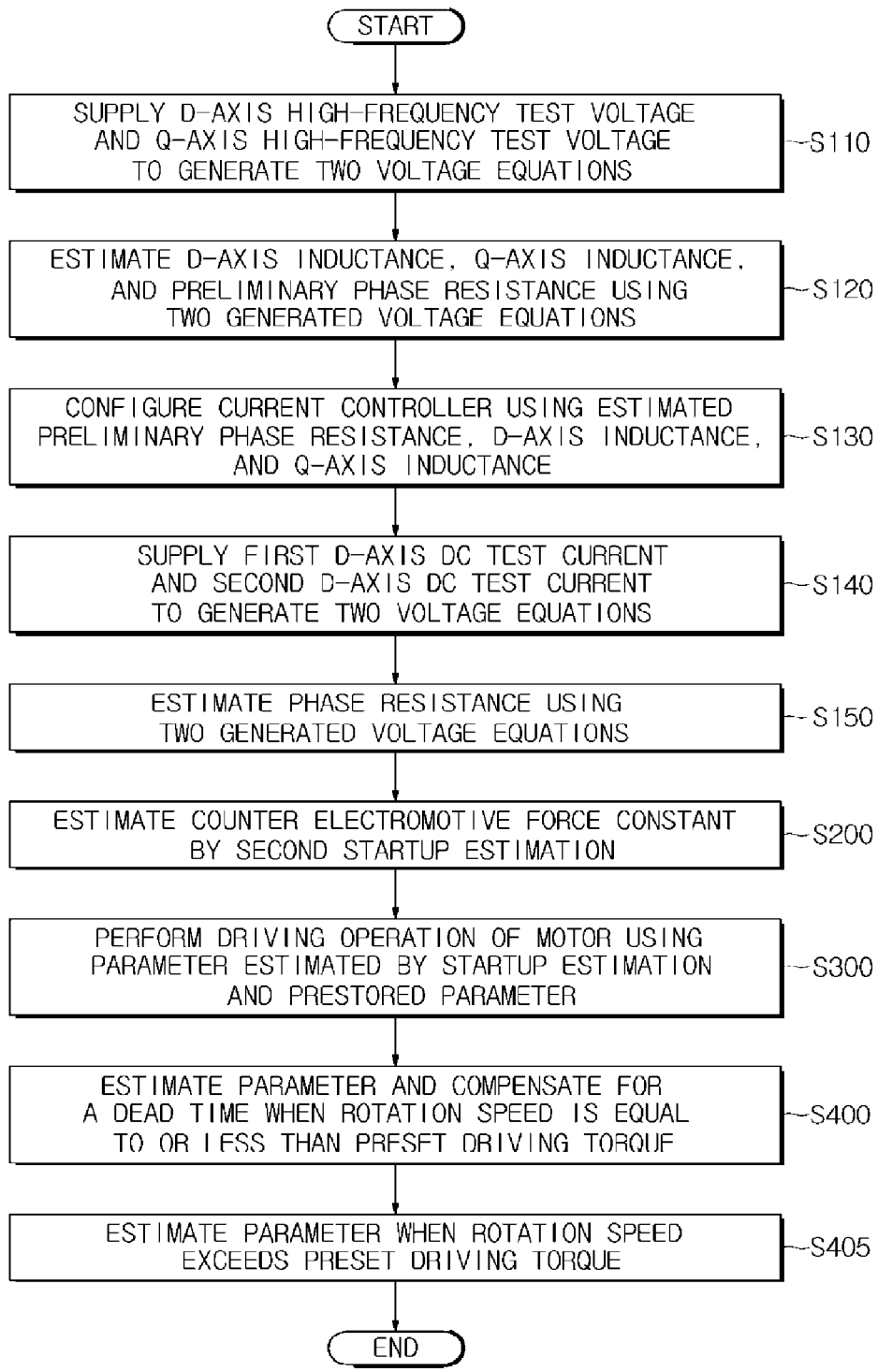

FIG. 20 is a schematic flow chart of a method of estimating a parameter in a motor driving apparatus according to a first embodiment.

First, the control unit supplies the d-axis high-frequency test voltage and the q-axis high-frequency test voltage to generate two voltage equations related to the d-axis voltage and the q-axis voltage (S110), and estimates the d-axis inductance, the q-axis inductance, and the preliminary phase resistance using the two generated voltage equations (S120).

In addition, the control unit configures the current controller using the estimated preliminary phase resistance, d-axis inductance, and q-axis inductance (S130), in order to form the first d-axis DC test current and the second d-axis DC test power. Also, the control unit supplies the generated first d-axis DC test current and the second d-axis DC test current in order to generate two voltage equations (S140).

In addition, the control unit simplifies the two generated voltage equations to estimate the phase resistance (S150) by removing $V_{offset}$, which is a parameter related to the nonlinearity of the inverter of the generated voltage equations.

In addition, the control unit estimates the counter electromotive force constant by the second startup estimation (S200), and performs the driving operation of the motor using the parameter estimated by the startup estimation and the pre-stored parameter (S300). Lastly, the control unit estimates the parameter while considering the dead time compensation when the torque of the motor is equal to or less than preset driving torque (S400), and estimates the parameter without considering the dead time compensation when the torque of the motor exceeds the preset driving torque (S405).

Figure 21:
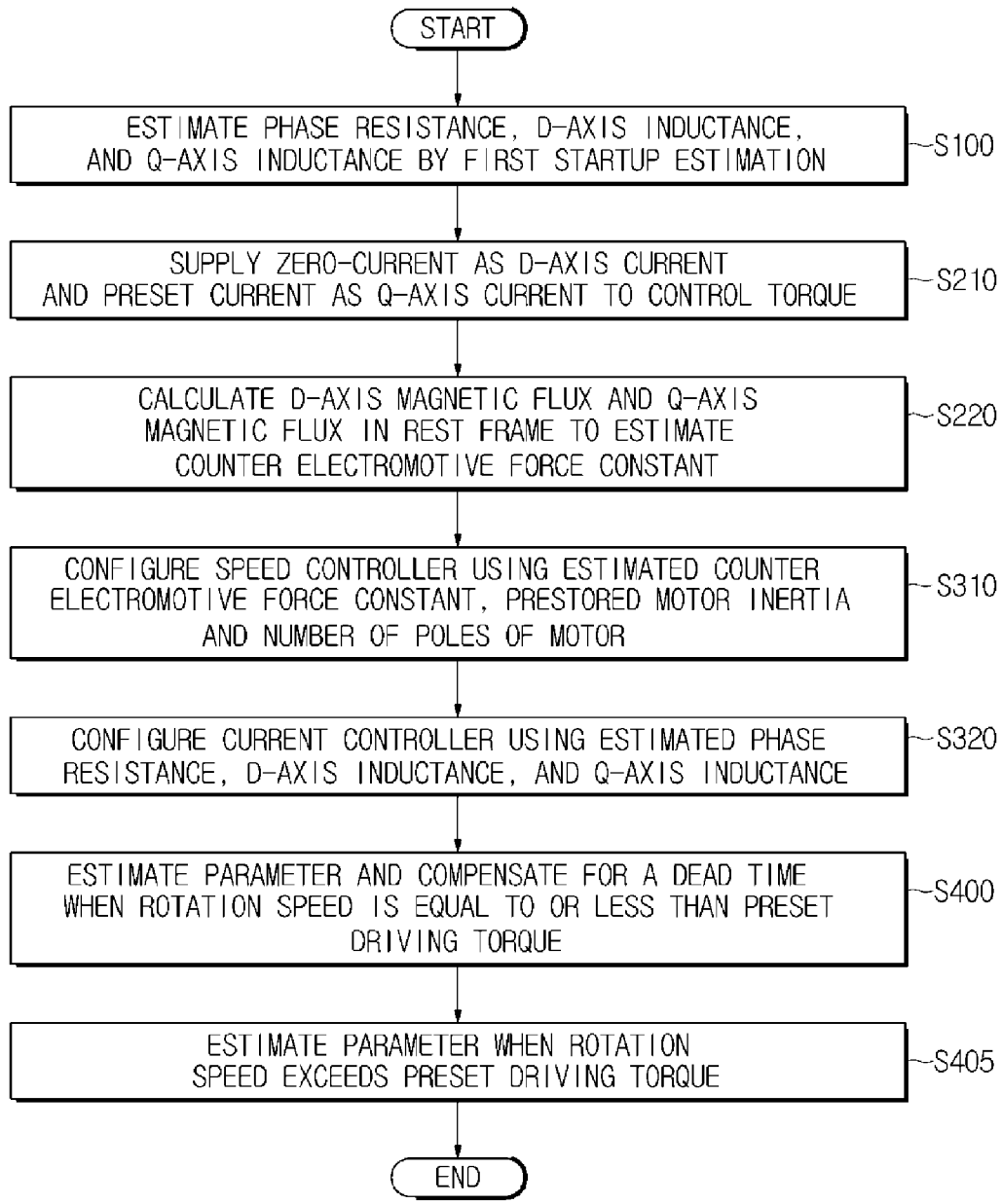

FIG. 21 is a schematic flow chart of a method of estimating a parameter in a motor driving apparatus according to a second embodiment.

First, the control unit estimates the phase resistance, the d-axis inductance, and the q-axis inductance by the first startup estimation (S100).

In addition, the control unit controls the d-axis current to be zero current and controls the q-axis current to supply a preset current value in order to control the torque such that the rotation speed of the motor is maintained in the preset startup speed (S210).

In addition, the control unit estimates the counter electromotive force constant by calculating the d-axis magnetic flux and the q-axis magnetic flux in a rest frame, which is a magnetic flux when the motor is in a rotating state (S220), and the control unit configures the speed controller using the estimated counter electromotive force constant and pre-stored motor inertia and number of poles of the motor (S310). Also, the control unit configures the current controller using the estimated phase resistance, d-axis inductance, and q-axis inductance (S320).

Lastly, the control unit estimates the parameter while considering the dead time compensation when torque of the motor is equal to or less than the preset driving torque (S400), and estimates the parameter without considering the dead time compensation when the torque of the motor exceeds the preset driving torque (S405).

Figure 22:
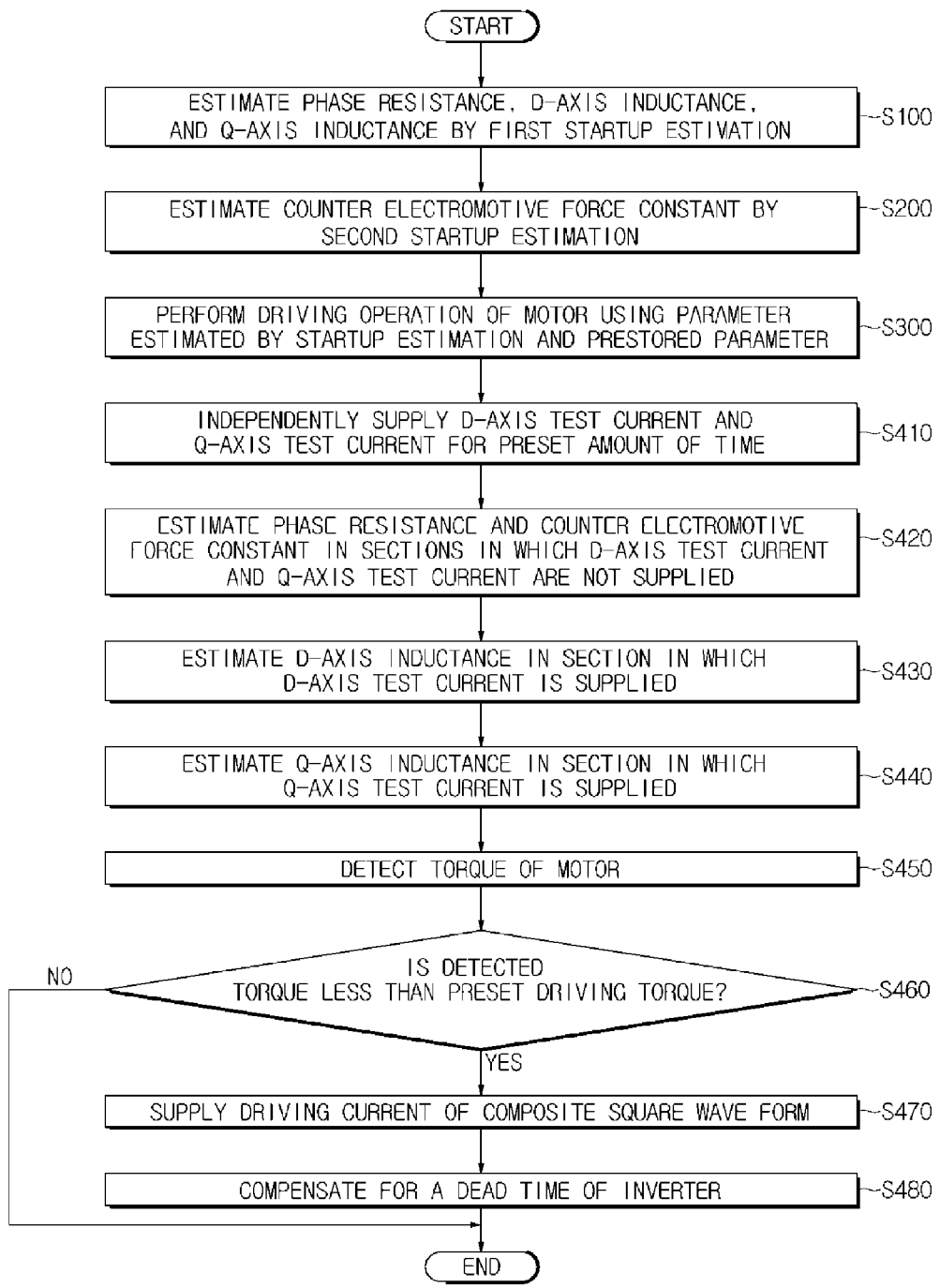

FIG. 22 is a schematic flow chart of a method of estimating a parameter in a motor driving apparatus according to a third embodiment.

First, the control unit estimates the phase resistance, the d-axis inductance, and the q-axis inductance by the first startup estimation (S100). Also, the control unit estimates the counter electromotive force constant by the second startup estimation (S200), and performs the driving operation of the motor using a parameter estimated by the startup estimation and a pre-stored parameter (S300).

The control unit controls the inverter to independently supply the d-axis test current and the q-axis test current for a preset amount of time (S410).

In addition, based on the data detected by the detection unit or the previously estimated data stored in the storage unit, the control unit estimates the phase resistance and the counter electromotive force constant in sections in which the d-axis test current and the q-axis test current are not supplied (S420).

Also, based on the data detected by the detection unit or the previously estimated data stored in the storage unit, the control unit estimates the d-axis inductance in the section in which the d-axis test current is supplied (S430), and estimates the q-axis inductance in the section in which the q-axis test current is supplied (S440).

In addition, the detection unit detects the torque of the motor (S450) and transmits the detected torque to the control unit, and the control unit determines whether the detected torque is smaller than the preset driving torque (S460).

When the detected torque is not smaller than the preset driving torque, the parameter estimation of the current degree ends without considering the dead time compensation.

However, when the detected torque is smaller than the preset driving torque, the control unit supplies the driving current such that the driving current becomes the step-like composite square wave in order to facilitate the dead time compensation (S470), and compensates for the dead time of the inverter based on the polarity of the driving current (S480).

According to the above-mentioned motor driving apparatus and the controlling method thereof, the accuracy of parameter estimation can be improved by reducing an error between a driving voltage and a command voltage using a nonlinearity of an inverter.

Although a few embodiments of the disclosure have been shown and described, it would be appreciated by those skilled in the art that changes may be made in these embodiments without departing from the principles of the disclosure, the scope of which is defined in the claims and their equivalents.

What is claimed is:

1. A motor driving apparatus comprising:
a motor having a rotor including a permanent magnet, and a stator;
an inverter configured to supply a driving power to the motor; and
a control unit configured to estimate a parameter by supplying a d-axis test current and a q-axis test current for a predetermined amount of time and configured to compensate for a dead time based on a polarity of a driving current by supplying a step-like composite square wave as a driving current, and
wherein the parameter may include a previously estimated parameter and a fixed parameter,
wherein the control unit controls the inverter such that the driving current becomes the step-like composite square wave due to a command current in a saw tooth waveform.

2. The motor driving apparatus according to claim 1, wherein the control unit generates the command current in the saw tooth waveform based on a position of the rotor.

3. The motor driving apparatus according to claim 1, wherein the control unit controls the inverter such that times at which the d-axis test current and the q-axis test current are supplied do not overlap.

4. The motor driving apparatus according to claim 1, wherein the parameters estimated in the control unit are a phase resistance, a counter electromotive force constant, a d-axis inductance, and a q-axis inductance.

5. The motor driving apparatus according to claim 1, wherein the control unit does not control the inverter such that the driving current becomes the step-like composite square wave when a torque of the rotor is equal to or greater than a preset driving torque.

6. The motor driving apparatus according to claim 1, wherein the control unit estimates the parameters using a startup estimation when the rotor is at standstill.

7. A motor driving apparatus comprising:
a motor having a rotor including a permanent magnet, and a stator;
an inverter configured to supply a driving power to the motor; and
a control unit configured to estimate a parameter using a startup estimation when a rotation speed of the rotor is less than a preset startup speed, configured to estimate the parameter using a driving estimation with a dead time compensation when the rotation speed of the rotor is equal to or greater than the preset startup speed and a torque of the rotor is equal to or less than a preset driving torque, and configured to estimate the parameter using the driving estimation without the dead time compensation when the rotation speed of the rotor is equal to or greater than the preset startup speed and the torque of the rotor exceeds the preset driving torque.

8. The motor driving apparatus according to claim 7, wherein, in the startup estimation of the control unit, the control unit controls the inverter to supply a d-axis high-frequency test voltage and a q-axis high-frequency test voltage in order to estimate a d-axis inductance, a q-axis inductance, and a phase resistance.

9. The motor driving apparatus according to claim 8, wherein, in the startup estimation of the control unit, the control unit controls the inverter to supply a first d-axis direct current test current and a second d-axis direct current test current in order to estimate the phase resistance.

10. The motor driving apparatus according to claim 7, wherein, in the startup estimation of the control unit, the control unit controls the inverter to supply only a q-axis current in order to control the rotation speed of the rotor to be less than the preset startup speed, and calculates a d-axis magnetic flux and a q-axis magnetic flux of a rest frame in order to estimate a counter electromotive force constant.

11. The motor driving apparatus according to claim 7, wherein, in the driving estimation of the control unit, the control unit controls the inverter to supply a d-axis test current and a q-axis test current for a predetermined amount of time in order to estimate a phase resistance, a counter electromotive force constant, a d-axis inductance, and a q-axis inductance.

12. The motor driving apparatus according to claim 7, wherein, in the dead time compensation of the control unit, the control unit controls the inverter such that a driving current becomes a step-like composite square wave, and compensates for a dead time based on a polarity of the driving current.

13. A controlling method of a motor driving apparatus, the method comprising:
supplying a d-axis test current and a q-axis test current for a predetermined amount of time;
estimating a parameter based on a d-axis current and a q-axis current of a time when the d-axis test current and the q-axis test current are supplied and a time when the d-axis test current and the q-axis test current are not supplied;
supplying a step-like composite square wave as a driving current; and
compensating for a dead time based on a polarity of the driving current.

14. The method according to claim 13, wherein the step-like composite square wave is generated as the driving current due to a command current of a saw tooth waveform.

15. The method according to claim 14, wherein the command current of a saw tooth waveform is generated based on a position of a rotor.

16. The method according to claim 15, further comprising supplying the step-like composite square wave as the driving current and stopping the compensating for a dead time when a torque of the rotor is equal to or greater than a preset driving torque.

17. The method according to claim 15, further comprising estimating the parameters using a startup estimation when the rotor is at standstill.

18. The method according to claim 13, wherein the d-axis test current and the q-axis test current are supplied such that the times of supplying thereof do not overlap.

19. The method according to claim 13, wherein the parameters estimated are a phase resistance, a counter electromotive force constant, a d-axis inductance, and a q-axis inductance.

20. A controlling method of a motor driving apparatus, the method comprising:
estimating a parameter using a startup estimation when a rotation speed of a rotor is less than a preset startup speed;
estimating the parameter using a driving estimation with compensating for a dead time when the rotation speed of the rotor is equal to or greater than the preset startup speed and a torque of the rotor is equal to or less than a preset driving torque; and
estimating the parameter using the driving estimation without the compensating for a dead time when the rotation speed of the rotor is equal to or greater than the preset startup speed and the torque of the rotor exceeds the preset driving torque.

21. The method according to claim 20, wherein, in the startup estimation, a d-axis high-frequency test voltage and a q-axis high-frequency test voltage are supplied to estimate a d-axis inductance, a q-axis inductance, and a phase resistance.

22. The method according to claim 21, wherein, in the startup estimation, a control unit supplies a first d-axis direct current test current and a second d-axis direct current test current in order to estimate the phase resistance.

23. The method according to claim 20, wherein, in the startup estimation, a q-axis current is supplied in order to maintain the rotation speed of the rotor to be less than the preset startup speed, and a d-axis magnetic flux and a q-axis magnetic flux of a rest frame is calculated in order to estimate a counter electromotive force constant.

24. The method according to claim 20, wherein, in the driving estimation, a d-axis test current and a q-axis test current are supplied for a predetermined time to estimate a phase resistance, a counter electromotive force constant, a d-axis inductance, and a q-axis inductance.

25. The method according to claim 20, wherein, in the compensating for a dead time, a step-like composite square wave is supplied as a driving current, and the dead time is compensated based on a polarity of the driving current.

* * * * *